US010482207B2

(12) United States Patent
Sugahara

(10) Patent No.: US 10,482,207 B2
(45) Date of Patent: Nov. 19, 2019

(54) VERIFICATION SUPPORT APPARATUS AND DESIGN VERIFICATION SUPPORT METHOD

(71) Applicant: FUJITSU LIMITED, Kawasaki-shi, Kanagawa (JP)

(72) Inventor: Osamu Sugahara, Sumida (JP)

(73) Assignee: FUJITSU LIMITED, Kawasaki (JP)

( * ) Notice: Subject to any disclaimer, the term of this patent is extended or adjusted under 35 U.S.C. 154(b) by 39 days.

(21) Appl. No.: 15/984,545

(22) Filed: May 21, 2018

(65) Prior Publication Data

US 2018/0341724 A1 Nov. 29, 2018

(30) Foreign Application Priority Data

May 24, 2017 (JP) ................................ 2017-102507

(51) Int. Cl.
*G06F 17/50* (2006.01)

(52) U.S. Cl.
CPC ........ *G06F 17/504* (2013.01); *G06F 17/5031* (2013.01); *G06F 2217/02* (2013.01); *G06F 2217/06* (2013.01); *G06F 2217/62* (2013.01); *G06F 2217/84* (2013.01)

(58) Field of Classification Search
CPC .................................................... G06F 17/504
USPC ........................................................ 716/108
See application file for complete search history.

(56) References Cited

U.S. PATENT DOCUMENTS

| | | | | |
|---|---|---|---|---|
| 10,067,189 | B1 * | 9/2018 | Shivaray | G01R 31/3177 |
| 2005/0172254 | A1 * | 8/2005 | Watanabe | G01R 31/31724 716/102 |
| 2005/0222795 | A1 * | 10/2005 | Rodgers | G01R 31/318552 702/117 |
| 2005/0229056 | A1 * | 10/2005 | Rohrbaugh | G01R 31/318566 714/726 |

(Continued)

FOREIGN PATENT DOCUMENTS

| | | |
|---|---|---|
| JP | 2003-194886 | 7/2003 |
| JP | 2006-004509 | 1/2006 |
| JP | 2012-146865 | 8/2012 |

OTHER PUBLICATIONS

Balaji et al., Novel Automatic Test Pattern Generator for degenerated Scan Bist VLSI Circuits, IRJET, vol. 3 Issue 3, pp. 1-5, Mar. 2016 (Year: 2016).*

*Primary Examiner* — Suresh Memula
(74) *Attorney, Agent, or Firm* — Fujitsu Patent Center

(57) ABSTRACT

A design verification support apparatus includes, a memory that stores circuit information and test pattern information, and a processor coupled to the memory. The processor performs a process including, acquiring the circuit information and the test pattern information from the memory, calculating a delay time occurring until the first clock signal reaches each of a plurality of memory circuits coupled in series and included in the scan chain from the clock source, based on the circuit information, selecting a first memory circuit whose first output value is to be changed by a shift operation among the plurality of memory circuits, based on the test pattern information at the cycle, and calculating the first output value of the first memory circuit when a second clock signal is supplied to the first memory circuit, the second clock signal being obtained by delaying the first clock signal by a delay time.

8 Claims, 19 Drawing Sheets

(56) References Cited

U.S. PATENT DOCUMENTS

2008/0104467 A1* 5/2008 Satsukawa ..... G01R 31/318552
714/729

* cited by examiner

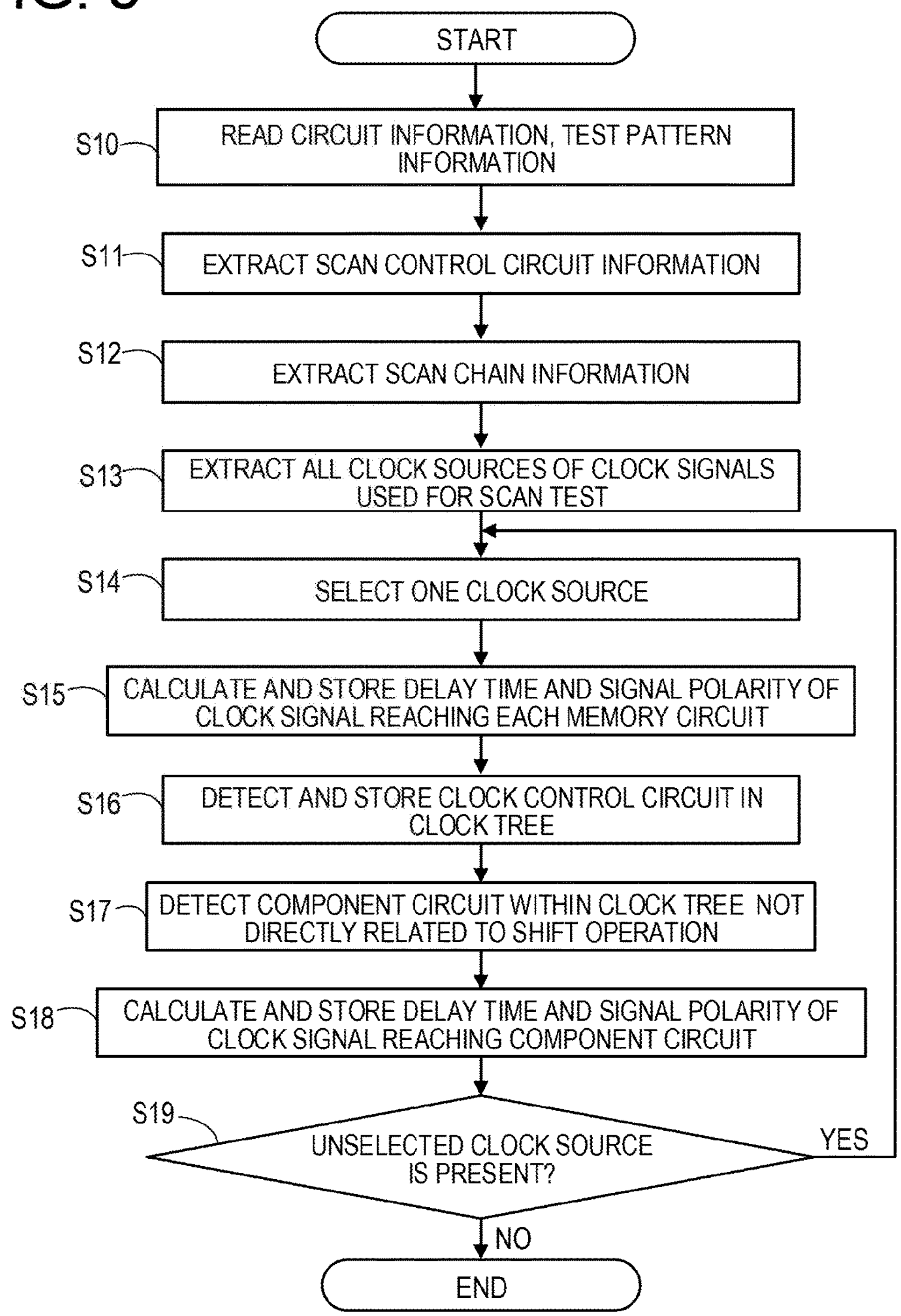
FIG. 5
START
S10
READ CIRCUIT INFORMATION, TEST PATTERN INFORMATION
S11
EXTRACT SCAN CONTROL CIRCUIT INFORMATION
S12
EXTRACT SCAN CHAIN INFORMATION
S13
EXTRACT ALL CLOCK SOURCES OF CLOCK SIGNALS USED FOR SCAN TEST
S14
SELECT ONE CLOCK SOURCE
S15
CALCULATE AND STORE DELAY TIME AND SIGNAL POLARITY OF CLOCK SIGNAL REACHING EACH MEMORY CIRCUIT
S16
DETECT AND STORE CLOCK CONTROL CIRCUIT IN CLOCK TREE
S17
DETECT COMPONENT CIRCUIT WITHIN CLOCK TREE NOT DIRECTLY RELATED TO SHIFT OPERATION
S18
CALCULATE AND STORE DELAY TIME AND SIGNAL POLARITY OF CLOCK SIGNAL REACHING COMPONENT CIRCUIT
S19
UNSELECTED CLOCK SOURCE IS PRESENT?
YES
NO
END

FIG. 7

TEST PATTERN INFORMATION

41a

| CYCLE | PULSE TYPE | SCAN-IN VALUE | EXPECTED SCAN-OUT VALUE |
|---|---|---|---|
| N+0 : | P10 | 0000000000000000 | XXXXXXXXXXXXXXXX |
| N+1 : | P10 | 1111111111111111 | XXXXXXXXXXXXXXXX |
| N+2 : | P10 | 0000000000000000 | XXXXXXXXXXXXXXXX |
| N+3 : | P10 | 1111111111111111 | XXXXXXXXXXXXXXXX |
| N+4 : | P10 | 0000000000000000 | XXXXXXXXXXXXXXXX |
| N+5 : | P10 | 1111111111111111 | XXXXXXXXXXXXXXXX |
| ⋮ | ⋮ | ⋮ | ⋮ |
| M+0 : | P10 | 0000000000000000 | XXXXXXXXXXXXXXXX |
| M+1 : | P10 | 0000000000000000 | LLLLLLLLLLLLLLLL |
| M+2 : | P10 | 0000000000000000 | HHHHHHHHHHHHHHHH |
| M+3 : | P10 | 0000000000000000 | LLLLLLLLLLLLLLLL |
| M+4 : | P10 | 0000000000000000 | HHHHHHHHHHHHHHHH |
| M+5 : | P10 | 0000000000000000 | LLLLLLLLLLLLLLLL |
| M+6 : | P10 | 0000000000000000 | HHHHHHHHHHHHHHHH |
| M+7 : | P10 | 0000000000000000 | LLLLLLLLLLLLLLLL |
| M+8 : | P11 | 0000000000000000 | HHHHHHHHHHHHHHHH |
| ⋮ | ⋮ | ⋮ | ⋮ |

FIG. 10

DELAY CALCULATION RESULT INFORMATION

42a

| | | | | | | |
|---|---|---|---|---|---|---|
| CLOCK SOURCE 56a1 ELEMENT ID: source1 | MEMORY CIRCUIT WITHIN SCAN CHAIN | ELEMENT ID | CLOCK TERMINAL ID | RISING DELAY | FALLING DELAY | SIGNAL POLARITY |
| | MEMORY CIRCUIT 51a1 | ffa1 | cka1 | tdra1 | tdfa1 | H |
| | MEMORY CIRCUIT 51a2 | ffa2 | cka2 | tdra2 | tdfa2 | H |
| | ⋮ | ⋮ | ⋮ | ⋮ | ⋮ | ⋮ |
| | MEMORY CIRCUIT 51an | ffan | ckan | tdran | tdfan | H |
| | ⋮ | ⋮ | ⋮ | ⋮ | ⋮ | ⋮ |
| | CLOCK CONTROL CIRCUIT | ELEMENT ID | CLOCK TREE TERMINAL ID | | | |
| | AND CIRCUIT 55b | cntr1 | ckt1 | | | |
| | SELECTOR 55c | cntr2 | ckt2 | | | |
| | ⋮ | ⋮ | ⋮ | | | |
| | COMPONENT CIRCUIT NOT RELATED TO SHIFT OPERATION | ELEMENT ID | CLOCK TERMINAL ID | RISING DELAY | FALLING DELAY | SIGNAL POLARITY |
| | ROM 55d | ig1 | ckb1 | tdrb1 | tdfb1 | H |
| | ⋮ | | | | | |
| CLOCK SOURCE 56a2 ELEMENT ID: source2 | MEMORY CIRCUIT WITHIN SCAN CHAIN | ELEMENT ID | CLOCK TERMINAL ID | RISING DELAY | FALLING DELAY | SIGNAL POLARITY |
| | ⋮ | ⋮ | ⋮ | ⋮ | ⋮ | ⋮ |

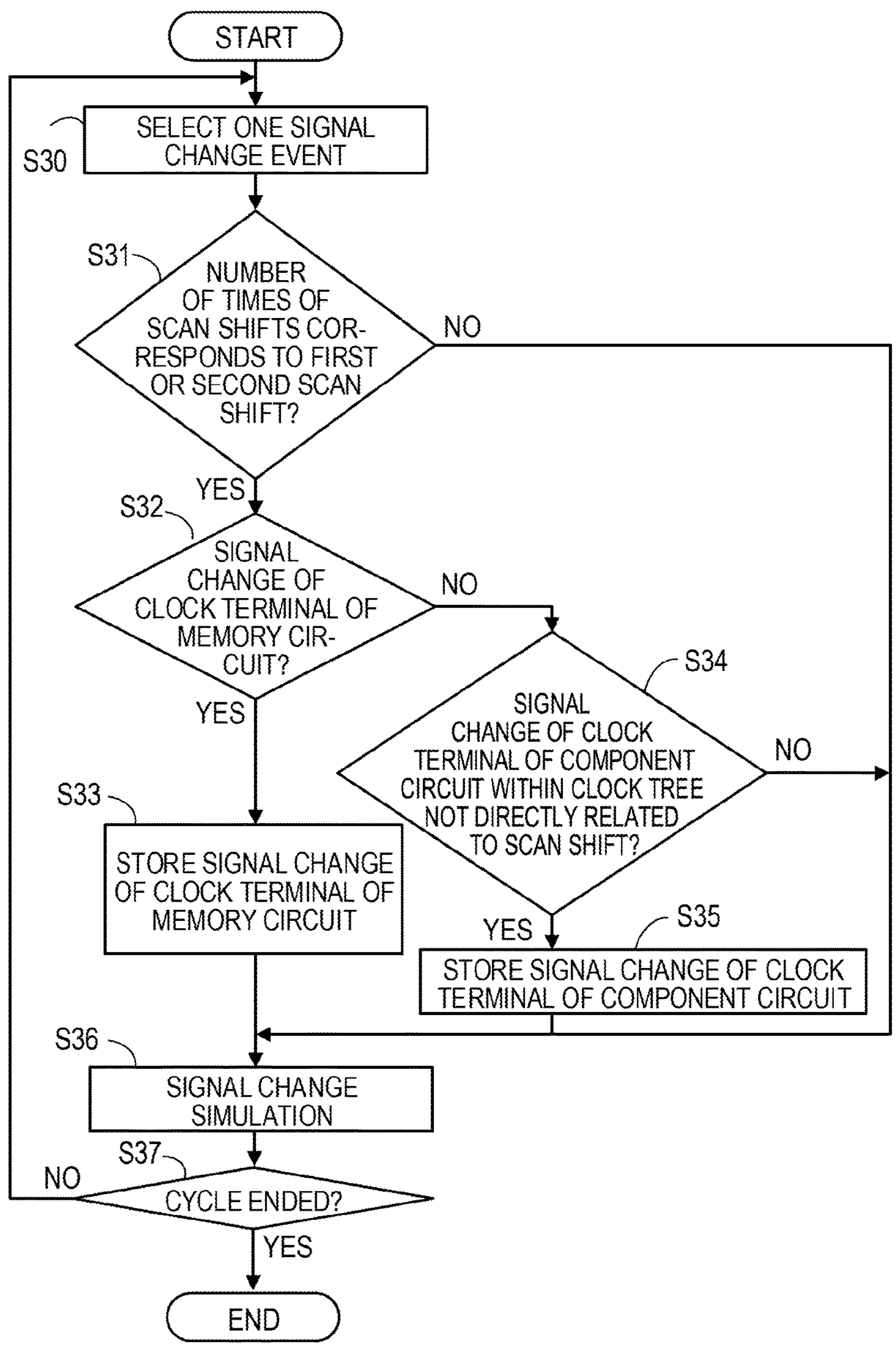

FIG. 14
START
SELECT ONE SIGNAL CHANGE EVENT
S30
S31
NUMBER OF TIMES OF SCAN SHIFTS COR-RESPONDS TO FIRST OR SECOND SCAN SHIFT?
NO
YES
S32
SIGNAL CHANGE OF CLOCK TERMINAL OF MEMORY CIR-CUIT?
NO
YES
S34
SIGNAL CHANGE OF CLOCK TERMINAL OF COMPONENT CIRCUIT WITHIN CLOCK TREE NOT DIRECTLY RELATED TO SCAN SHIFT?
NO
S33
STORE SIGNAL CHANGE OF CLOCK TERMINAL OF MEMORY CIRCUIT
YES
S35
STORE SIGNAL CHANGE OF CLOCK TERMINAL OF COMPONENT CIRCUIT
S36
SIGNAL CHANGE SIMULATION
S37
NO
CYCLE ENDED?
YES
END

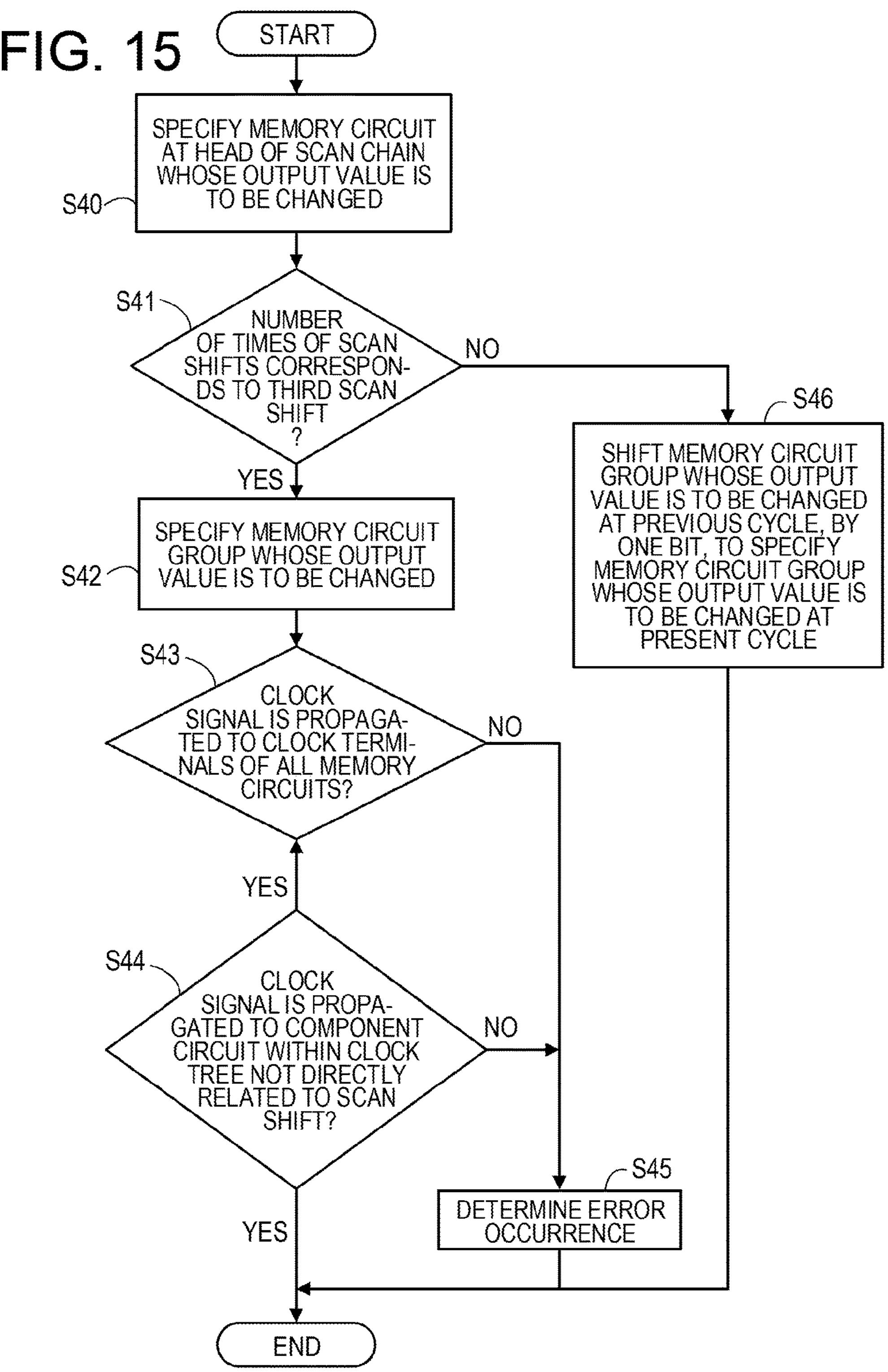
FIG. 15
START
SPECIFY MEMORY CIRCUIT AT HEAD OF SCAN CHAIN WHOSE OUTPUT VALUE IS TO BE CHANGED
S40
S41
NUMBER OF TIMES OF SCAN SHIFTS CORRESPONDS TO THIRD SCAN SHIFT ?
NO
YES
S46
SHIFT MEMORY CIRCUIT GROUP WHOSE OUTPUT VALUE IS TO BE CHANGED AT PREVIOUS CYCLE, BY ONE BIT, TO SPECIFY MEMORY CIRCUIT GROUP WHOSE OUTPUT VALUE IS TO BE CHANGED AT PRESENT CYCLE
SPECIFY MEMORY CIRCUIT GROUP WHOSE OUTPUT VALUE IS TO BE CHANGED
S42
S43
CLOCK SIGNAL IS PROPAGATED TO CLOCK TERMINALS OF ALL MEMORY CIRCUITS?
NO
YES
S44
CLOCK SIGNAL IS PROPAGATED TO COMPONENT CIRCUIT WITHIN CLOCK TREE NOT DIRECTLY RELATED TO SCAN SHIFT?
NO
S45
DETERMINE ERROR OCCURRENCE
YES
END

FIG. 19

```
SIMULATION START TIME : m/d/y h:m:s
                              ⋮
                                                   TIMING ERROR
E104 Time=230619000(cycle=1014) timing error(setup)
  gate(/EO/JBA9B/I025H) type(KOBSC) pin(CLK SI) setup-time (204)
E105 Time=230648000(cycle=1028) timing error(hold)
  gate(/SXD0/SL0/ECH4B_S2/I02XL) type(KOBSC) pin(CLK SI) hold-time (730)
E101 Time=230939000(cycle=2310) strobe error   pin(CR74) status(sim:X pat:L)
E101 Time=231039000(cycle=2311) strobe error   pin(CS81) status(sim:L pat:H)
                              ⋮                EXPECTED VALUE ERROR

 <<< simulation result report >>>
          CIRCUIT INFORMATION NAME ........................... chip
     TEST PATTERN INFORMATION NAME ........................... Scan-test1.pat
            UNIT TIME OF SIMULATION .................... 1 ps
                                ⋮
         SIMULATION EXECUTION TIME ........................... h:m:s

 NUMBER OF EXPECTED VALUE ERRORS................   120
          NUMBER OF TIMING ERRORS................   314
                                ⋮
```

VERIFICATION SUPPORT APPARATUS AND DESIGN VERIFICATION SUPPORT METHOD

CROSS-REFERENCE TO RELATED APPLICATION

This application is based upon and claims the benefit of priority of the prior Japanese Patent Application No. 2017-102507, filed on May 24, 2017, the entire contents of which are incorporated herein by reference.

FIELD

The embodiments discussed herein are related to a design verification support apparatus, a design verification support program, and a design verification support method of a semiconductor.

BACKGROUND

As a semiconductor device including a scanning mechanism in order to facilitate a manufacturing test or an evaluation, a large scale integrated circuit (LSI) or the like is known. As a mechanism of detecting an internal state of the LSI, a scan chain is included in the scanning mechanism. The scan chain has a structure in which a plurality of memory circuits (scan flip-flops or latch circuits) are coupled in series between an external input terminal and an external output terminal of the semiconductor. For the scan chain, an LSI tester may control the internal state of the semiconductor by inputting a signal from the external input terminal of the semiconductor, and observe the internal state by detecting a signal output from the external output terminal so that a test may be easily performed.

Meanwhile, in order to verify whether the scan chain is correctly coupled in a design stage, a simulation may be executed on a computer in a design verification process of the semiconductor. At the time of simulation, at each cycle of a clock signal, for example, a test pattern in which 0 and 1 are repeated a predetermined number of times, and all other values are 0's or 1's is input to the scan chain from the external input terminal of the semiconductor. Then, it is checked whether a value output from the external output terminal is equal to an expected value input to the external input terminal after each memory circuit of the scan chain performs a shift operation in synchronization with the clock signal a predetermined number of times.

As the circuit scale of a semiconductor has recently increased, the number of memory circuits included in a scan chain also increases.

Related techniques are disclosed in, for example, Japanese Laid-Open Patent Publication Nos. 2003-194886, 2006-004509, and 2012-146865.

SUMMARY

According to an aspect of the embodiments, a design verification support apparatus includes, a memory that stores circuit information including information on a connection destination of a component circuit included in the semiconductor having a scan chain, and a propagation delay occurring by the component circuit, and test pattern information indicating a test value to be input from a scan-in terminal of the scan chain at each cycle of a first clock signal output by a clock source; and a processor coupled to the memory. The processor performs a first processing of acquiring the circuit information and the test pattern information from the memory, calculating a delay time occurring until the first clock signal reaches each of a plurality of memory circuits coupled in series and included in the scan chain from the clock source, based on the circuit information, and selecting a first memory circuit whose first output value is to be changed by a shift operation among the plurality of memory circuits, based on the test pattern information at the cycle, and a second processing of calculating the first output value of the first memory circuit when a second clock signal is supplied to the first memory circuit, the second clock signal being obtained by delaying the first clock signal by a first delay time calculated for the first memory circuit among delay times calculated for the plurality of memory circuits, respectively.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 5 is a flow chart illustrating an example of a preprocessing procedure;

FIG. 7 is a view illustrating an example of test pattern information;

FIG. 10 is a view illustrating an example of delay calculation result information;

FIG. 14 is a flow chart illustrating an example of a low-speed simulation sequence for one cycle;

FIG. 15 is a flow chart illustrating an example of a sequence of a processing of calculating memory circuits whose output values are to be changed;

FIG. 19 is a view illustrating a display example of report information.

DESCRIPTION OF EMBODIMENTS

The number of effective bits (for example, the number of bits in the portion where 0 and 1 are repeated) of a test pattern used for checking whether a scan chain is correctly coupled is small with respect to the number of all memory circuits included in the scan chain. Thus, the number of memory circuits whose output values are changed by one shift operation by the test pattern is also small with respect to the number of all memory circuits of the scan chain. Nevertheless, in a conventional method, there is a problem in that since the propagation delay of a clock signal reaching each memory circuit each time a shift operation is performed and output values of all memory circuits in synchronization with the reached clock signals are calculated, a calculation amount increases and thus a calculation time is prolonged.

Hereinafter, embodiments of the disclosure will be described with reference to drawings.

First Embodiment

Figure 1:
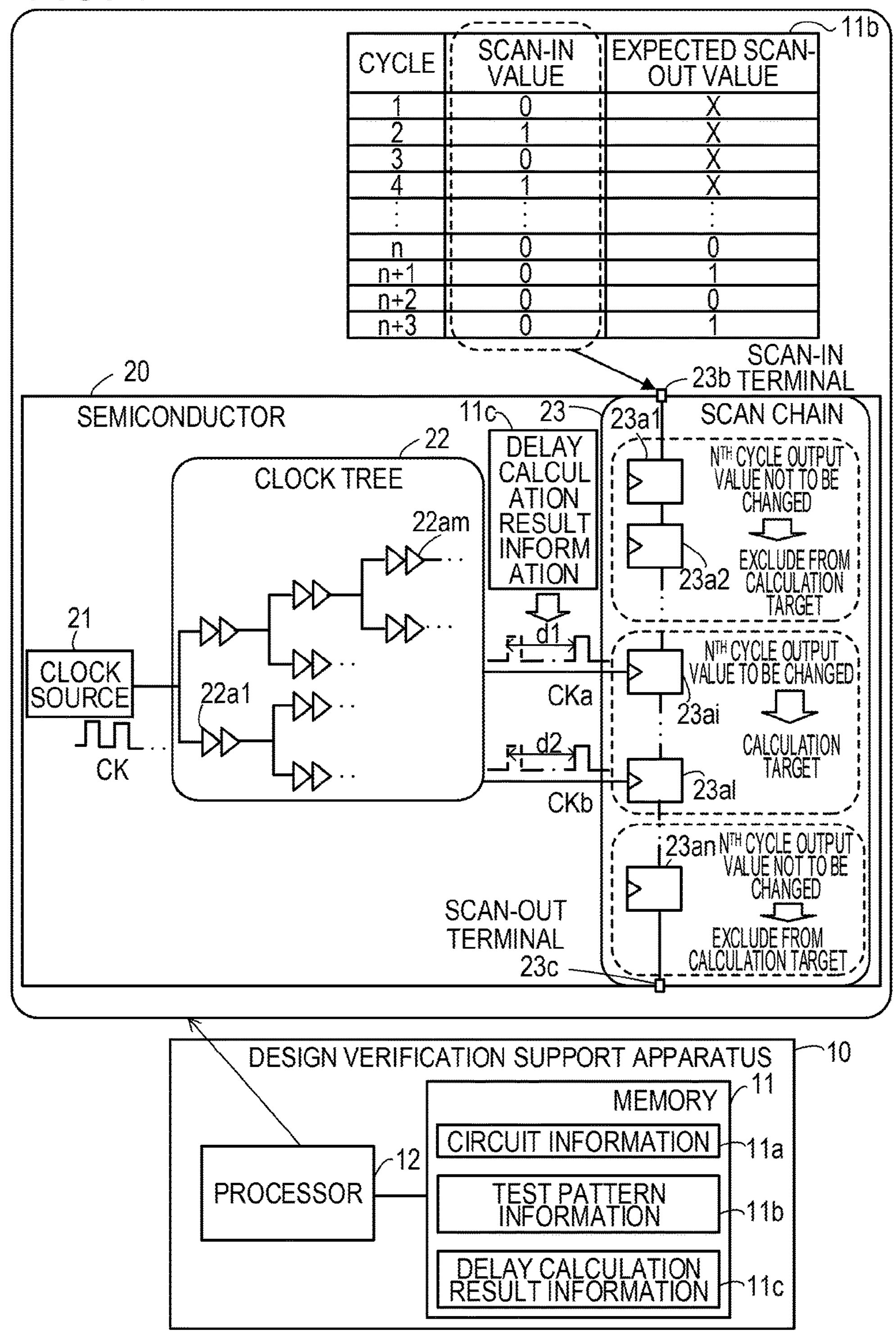
FIG. 1 is a view illustrating an example of a design verification support apparatus according to a first embodiment.

FIG. 1 is a view illustrating an example of a design verification support apparatus according to a first embodiment.

A design verification support apparatus 10 according to the first embodiment performs a simulation for a connection test of a scan chain by software to support a design verification of a semiconductor.

The design verification support apparatus 10 includes a memory 11 and a processor 12.

The memory 11 is a volatile memory device such as a random access memory (RAM), or a non-volatile memory device such as a flash memory, an electrically erasable programmable read only memory (EEPROM), or a hard disk drive (HDD).

The memory 11 stores circuit information 11*a*, test pattern information 11*b*, and delay calculation result information 11*c*.

The circuit information 11*a* includes information on a connection destination of a component circuit included in a semiconductor having a scan chain, as a design target, and a propagation delay occurring by the component circuit. The component circuit is a clock buffer included in a clock tree, a memory circuit included in the scan chain (a scan flip-flop or a latch circuit), wiring, or the like.

The test pattern information 11*b* indicates a test value to be input from a scan-in terminal (an external input terminal of the semiconductor) of the scan chain at every cycle of a clock signal output by a clock source in order to perform a connection test of the scan chain. Hereinafter, the test value is referred to as a scan-in value, and a pattern of scan-in values to be sequentially input to the scan-in terminal at every cycle is referred to as a test pattern.

The delay calculation result information 11*c* is information generated by the processor 12 through the processings to be described below.

The design verification support apparatus 10 may accept input by a user, and create the circuit information 11*a* or the test pattern information 11*b* based on the input. The design verification support apparatus 10 may acquire the circuit information 11*a* or the test pattern information 11*b* from other devices. The user is, for example, a designer of the semiconductor, a person in charge of a design verification of the semiconductor, or the like.

The processor 12 is a processor as an arithmetic processing device, such as a central processing unit (CPU), a digital signal processor (DSP), or the like. Meanwhile, the processor 12 may include an electronic circuit for specific application such as an application specific integrated circuit (ASIC) or a field programmable gate array (FPGA). The processor executes programs stored in a memory such as a RAM. For example, a design verification support program of the semiconductor is executed. A set of a plurality of processors may be referred to as a "multi-processor" or may be simply referred to as a "processor."

The processor 12 acquires (reads) the circuit information 11*a* and the test pattern information 11*b* from the memory 11. Then, the processor 12 calculates a delay time occurring until a clock signal reaches each of a plurality of memory circuits coupled in series and included in the scan chain, based on the circuit information 11*a*. Then, the processor 12 stores the delay calculation result information 11*c* including a calculation result of a delay time for each of the plurality of memory circuits in, for example, the memory 11. The delay calculation result information 11*c* may include information indicating a signal polarity of a clock signal when the clock signal reaches each of the plurality of memory circuits. The signal polarity is a logical level (a high (H) level or a low (L) level) of the clock signal. By considering the signal polarity, it is possible to cope with a case where a logical level of a clock signal is reversed in a clock tree.

The processor 12 performs the following processings at each cycle of a clock signal output by a clock source. The processor 12 selects a memory circuit whose output value is to be changed by a shift operation at the cycle, among the plurality of memory circuits, based on the test pattern information 11*b*. Then, the processor 12 acquires a delay time calculated for the selected memory circuit, among delay times calculated for the plurality of memory circuits, respectively, based on the delay calculation result information 11*c*. Then, the processor 12 calculates an output value of the selected memory circuit when a clock signal obtained by delaying the clock signal output by the clock source by the acquired delay time is supplied to the memory circuit.

The processor 12 detects occurrence of an error based on a comparison result between a scan-out value output from a scan-out terminal of the scan chain (the external input terminal of the semiconductor), and an expected value of the scan-out value, and outputs report information indicating that the error has been detected.

FIG. 1 illustrates an example of the semiconductor 20 to be designed.

The semiconductor 20 to be designed includes a clock source 21, a clock tree 22 including clock buffers 22*a*1 to 22*am*, and a scan chain 23 including scan flip-flops 23*a*1 to 23*an* as an example of a plurality of memory circuits.

The clock source 21 outputs a clock signal CK for shifting the scan flip-flops 23*a*1 to 23*an* of the scan chain 23. The clock source 21 is one of the external input terminals of the semiconductor 20 when the clock signal CK is supplied from the outside of the semiconductor 20.

The clock tree 22 includes the clock buffers 22*a*1 to 22*am* coupled in a tree shape, and propagates (distributes) the clock signal CK output by the clock source 21 to the scan flip-flops 23*a*1 to 23*an*.

The scan chain 23 includes the scan flip-flops 23*a*1 to 23*an*, a scan-in terminal 23*b*, and a scan-out terminal 23*c*. Each of the scan flip-flops 23*a*1 to 23*an* includes, for example, a multiplexer and a flip-flop. The multiplexer selects one of two input values, based on a scan enable signal. One of the two input values is a value output by a combinational circuit (not illustrated) within the semiconductor 20, and the other is a value output by a preceding stage scan flip-flop (a scan-in value input from the scan-in terminal 23*b* in the case of a first stage scan flip-flop). The flip-flop accepts the input value selected by the multiplexer at a timing synchronized with a clock signal. The clock signal is obtained by delaying the clock signal CK output from the clock source 21, by the clock tree 22.

A plurality of lines of scan chains may be provided.

The above described circuit configuration of the semiconductor 20 is illustrated in the circuit information 11*a*.

Hereinafter, as an example of a design verification support method according to the first embodiment, a method of simulating a connection test of the scan chain 23 of the semiconductor 20 will be described.

The processor 12 acquires the circuit information 11*a* and the test pattern information 11*b* from the memory 11.

Then, the processor 12 calculates a delay time occurring until the clock signal CK reaches each of the scan flip-flops 23*a*1 to 23*an* included in the scan chain 23, based on the circuit information 11*a*. As described above, the circuit information 11*a* includes information on the connection destination of a component circuit included in the semiconductor, and the propagation delay occurring by the component circuit. Thus, the processor 12 may calculate the delay time by adding a propagation delay occurring in each component circuit present between the clock source 21 and a clock terminal of each of the scan flip-flops 23*a*1 to 23*an* based on the circuit information 11*a*.

FIG. 1 illustrates an example of clock signals CKa and CKb supplied to clock terminals of the scan flip-flops 23*ai* and 23*al*. The clock signal CKa is obtained by delaying the clock signal CK by a delay time d1. The clock signal CKb is obtained by delaying the clock signal CK by a delay time d2.

The processor 12 stores the delay time calculated as described above, as the delay calculation result information 11*c*, in, for example, the memory 11.

Then, the processor 12 performs the following processing at each cycle of the clock signal CK output from the clock source 21.

The processor 12 selects a scan flip-flop whose output value is to be changed by a shift operation at the present cycle, among the scan flip-flops 23*a*1 to 23*an*, based on the test pattern information 11*b*.

FIG. 1 illustrates an example of the test pattern information 11*b*.

The test pattern information 11*b* includes a scan-in value and an expected value of a scan-out value (an expected scan-out value) at each cycle of the clock signal CK output by the clock source 21. As the scan-in values, in the example of FIG. 1, 0 and 1 are repeatedly set for predetermined cycles, and thereafter, 0 is set.

The expected scan-out values are set to “X” before an $n^{th}$ cycle in which a scan-in value of a first cycle is output from the last stage scan flip-flop 23*an* by a shift operation of the scan flip-flops 23*a*1 to 23*an*. “X” indicates that there is no expected value. At the $n^{th}$ and subsequent cycles, the same values as scan-in values at the first and subsequent cycles are set to expected scan-out values.

FIG. 1 illustrates an example in which the scan flip-flops 23*ai* to 23*al* are selected as scan flip-flops whose output values are to be changed by a shift operation at an $N^{th}$ cycle.

The processor 12 acquires delay times calculated for the selected scan flip-flops, among delay times calculated for the scan flip-flops 23*a*1 to 23*an*, respectively, based on the delay calculation result information 11*c*. For example, as described above, when the scan flip-flops 23*ai* to 23*al* are selected at the $N^{th}$ cycle, the processor 12 acquires a delay time (a delay time d1, d2, or the like) calculated for each of the scan flip-flops 23*ai* to 23*al*.

The processor 12 calculates an output value of the selected scan flip-flop when a clock signal (clock signals CKa, CKb, or the like) obtained by delaying the clock signal CK output from the clock source 21 by the acquired delay time is supplied to the scan flip-flop.

For example, the processor 12 determines whether to change the output value of each of the scan flip-flops 23*ai* to 23*al*, from a change timing of an output value of a preceding stage scan flip-flop and a change timing of a clock signal based on the acquired delay time.

For example, when the relationship between both change timings satisfies constraints of a set-up time or a holding time (these times are included in, for example, the circuit information 11*a*), the processor 12 changes the output value (change from 0 to 1 or change from 1 to 0). When the relationship between both change timings does not satisfy constraints of a set-up time or a holding time, the processor 12 does not change the output value. When changing the output value of the scan flip-flop, the processor 12 stores information on the change timing of the output value in addition to the output value, for example, in the memory 11, in order to determine whether to change an output value of a following stage scan flip-flop.

At the $N^{th}$ cycle, for the scan flip-flops 23*a*1 to 23*an* except for the scan flip-flops 23*ai* to 23*al* whose output values are to be changed by a shift operation, the processor 12 does not calculate an output value. Thus, at the $N^{th}$ cycle, the scan flip-flops 23*a*1, 23*a*2, 23*an*, and the like whose output values are not to be changed are excluded from calculation targets. However, the processor 12 may calculate an output value of a scan flip-flop coupled to an output terminal of the scan flip-flop 23*al* at the $N^{th}$ cycle. This is to make it possible to consider an influence of a racing phenomenon or the like in which the value is received for another scan flip-flop at the following stage of a scan flip-flop for which a value is to be received.

When the above described test pattern in which 0 and 1 are repeated for predetermined cycles is used, at the $N+1^{th}$ and subsequent cycles, a group of scan flip flops whose output values are to be changed by a shift operation is obtained by shifting the scan flip-flops 23*ai* to 23*al* to the following stages, stage by stage.

The processor 12 detects whether an error occurs based on a comparison result between a scan-out value and an expected scan-out value. For example, the processor 12 determines that an error occurs when the expected scan-out value is different from the scan-out value output from the scan-out terminal 23*c* at the $n^{th}$ and subsequent cycles in which expected scan-out values become the same as scan-in values at the first and subsequent cycles.

Then, when the processings of all the cycles described in the test pattern information 11*b* are completed, the processor 12 generates report information indicating which cycle an error has occurred. The processor 12 may store the report information in the memory 11, or may display the report information on a display device (not illustrated).

As described above, the design verification support apparatus 10 according to the first embodiment, which simulates a connection test of a scan chain, calculates, in advance, a delay time of a clock signal occurring between a clock source and each memory circuit of the scan chain. Then, the design verification support apparatus 10 limits the number of memory circuits for which operations (changes of output values) when the clock signal is supplied are to be calculated, based on the number of memory circuits whose output values are to be changed by a test pattern.

At each cycle, according to connection of clock buffers in a clock tree, when a processing of sequentially propagating a signal change of a clock source to each clock buffer is performed by considering a delay in each clock buffer, and an operation of each memory circuit reached by the signal change is calculated, the calculation time increases. However, by the above described method, the calculation time may be shortened. This is because the number of memory circuits for which operations are to be calculated at each cycle decreases and at the same time, the operations of the selected memory circuits are calculated at each cycle using a previously calculated delay time.

When an error is detected in the simulation of the connection test of the scan chain, the simulation may be repeatedly performed for an error analysis. According to the above described method, since the calculation time (the simulation time) may be shortened, a turn around time (TAT) for the error analysis may also be shortened. Accordingly, a period of a design verification process may be shortened, and thus, the whole period of the manufacturing process of the semiconductor may be expected to be shortened.

Second Embodiment

Next, a second embodiment will be described.

Figure 2:
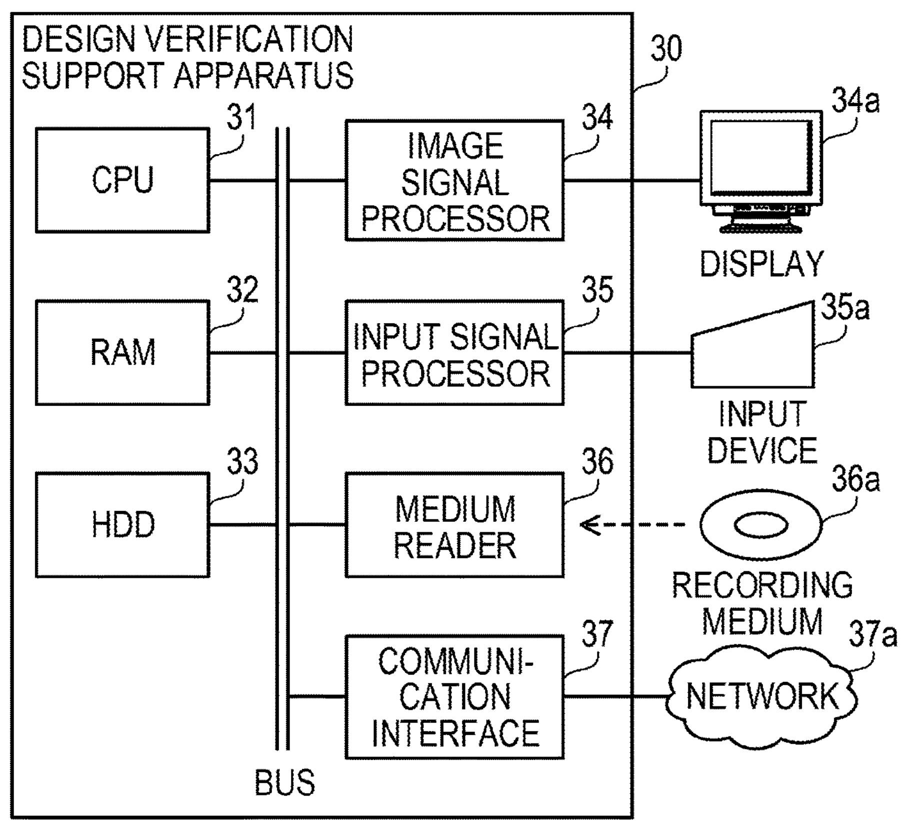
FIG. 2 is a block diagram illustrating an example of hardware of the design verification support apparatus.

FIG. 2 is a block diagram illustrating an example of hardware of the design verification support apparatus.

A design verification support apparatus 30 includes a CPU 31, a RAM 32, an HDD 33, an image signal processor 34, an input signal processor 35, a medium reader 36, and a communication interface 37. These units are coupled to a bus.

The CPU 31 is a processor including an arithmetic circuit that executes instructions of a program. The CPU 31 loads at least a part of a program or data stored in the HDD 33, in the RAM 32, and then executes the program. The CPU 31 may include a plurality of processor cores, and the design verification support apparatus 30 may include a plurality of processors. The processings to be described below may be executed in parallel by using the plurality of processors or the plurality of processor cores. A set of a plurality of processors (a multi-processor) may be referred to as a "processor."

The RAM 32 is a volatile semiconductor memory that temporarily stores a program to be executed by the CPU 31 or data to be used for an arithmetic operation by the CPU 31. The design verification support apparatus 30 may include a memory of a type other than the RAM, or include a plurality of memories.

The HDD 33 is a non-volatile memory device that stores a program of software such as operating system (OS), middleware or application software, and data. The program includes, for example, an operation schedule calculating program by which the design verification support apparatus 30 executes calculation of an operation schedule. The design verification support apparatus 30 may include another type of memory device such as a flash memory or a solid state drive (SSD), or include a plurality of non-volatile memory devices.

The image signal processor 34 outputs an image to a display 34*a* coupled to the design verification support apparatus 30 according to an instruction from the CPU 31. As the display 34*a*, a cathode ray tube (CRT) display, a liquid crystal display (LCD), a plasma display panel (PDP), an organic electro-luminescence (OEL) display or the like may be used.

The input signal processor 35 acquires an input signal from an input device 35*a* coupled to the design verification support apparatus 30, and outputs the input signal to the CPU 31. As the input device 35*a*, a pointing device such as a mouse, a touch panel, a touch pad or a track ball, a keyboard, a remote controller, a button switch or the like may be used. A plurality of types of input devices may be coupled to the design verification support apparatus 30.

The medium reader 36 is a reading device that reads programs or data recorded in a recording medium 36*a*. As the recording medium 36*a*, for example, a magnetic disk, an optical disk, a magneto-optical (MO) disk, a semiconductor memory or the like may be used. The magnetic disk includes a flexible disk (FD) or a HDD. The optical disk includes a compact disc (CD) or a digital versatile disc (DVD).

The medium reader 36 copies, for example, the program or data read from the recording medium 36*a*, to another recording medium such as the RAM 32 or the HDD 33. The read program is executed by, for example, the CPU 31. The recording medium 36*a* may be a portable recording medium, which may be used to distribute the program or data. The recording medium 36*a* or the HDD 33 may be referred to as a computer-readable recording medium.

The communication interface 37 is an interface coupled to a network 37*a* to communicate with another information processing apparatus through the network 37*a*. The communication interface 37 may be a wired communication interface coupled to a communication device such as a switch via a cable, or a wireless communication interface coupled to a base station via a wireless link.

Next, the function and the processing procedure of the design verification support apparatus 30 will be described.

Figure 3:
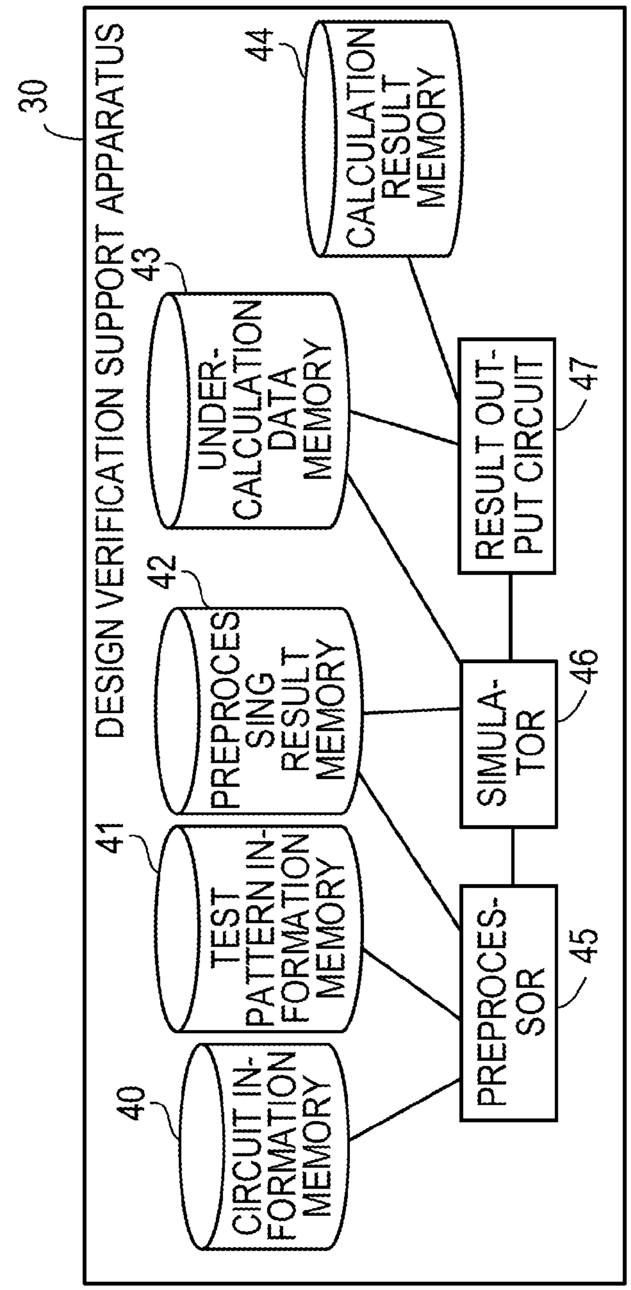
FIG. 3 is a block diagram illustrating an example of a function of the design verification support apparatus.

FIG. 3 is a block diagram illustrating an example of a function of the design verification support apparatus.

The design verification support apparatus 30 includes a circuit information memory 40, a test pattern information memory 41, a preprocessing result memory 42, an under-calculation data memory 43, a calculation result memory 44, a preprocessor 45, a simulator 46, and a result output unit 47.

The circuit information memory 40, the test pattern information memory 41, the preprocessing result memory 42, the under-calculation data memory 43, and the calculation result memory 44 may be implemented using, for example, a memory area secured in the RAM 32 or the HDD 33. The preprocessor 45, the simulator 46, and the result output unit 47 may be implemented using, for example, a program module executed by the CPU 31.

The circuit information memory 40 stores circuit information that includes information on a connection destination of a component circuit included in a semiconductor having a scan chain, as a design target, and a propagation delay occurring by the component circuit.

The test pattern information memory 41 stores test pattern information.

The preprocessing result memory 42 stores a result of a preprocessing performed by the preprocessor 45. The preprocessing result includes a calculation result of a delay time occurring until a clock signal reaches each of a plurality of memory circuits coupled in series and included in the scan chain. The preprocessing result further includes information on a scan control circuit or a scan chain, which is extracted from the circuit information.

The under-calculation data memory 43 stores data generated during calculation by the simulator 46.

The calculation result memory 44 stores report information or the like which is generated and output by the result output unit 47.

The preprocessor 45 acquires the circuit information or the test pattern information, and at the same time, calculates a delay time occurring until a clock signal reaches each of a plurality of memory circuits coupled in series and included in the scan chain, or a signal polarity of the clock signal when the clock signal reaches each of the plurality of memory circuits. Furthermore, the preprocessor 45 extracts information on a scan control circuit or a scan chain from the circuit information.

The simulator 46 simulates a connection test of the scan chain based on the test pattern information.

The result output unit 47 outputs report information indicating the result of the connection test of the scan chain. For example, the result output unit 47 stores the report information in the calculation result memory 44. The result output unit 47 may display the report information on the display 34*a*.

Figure 4:
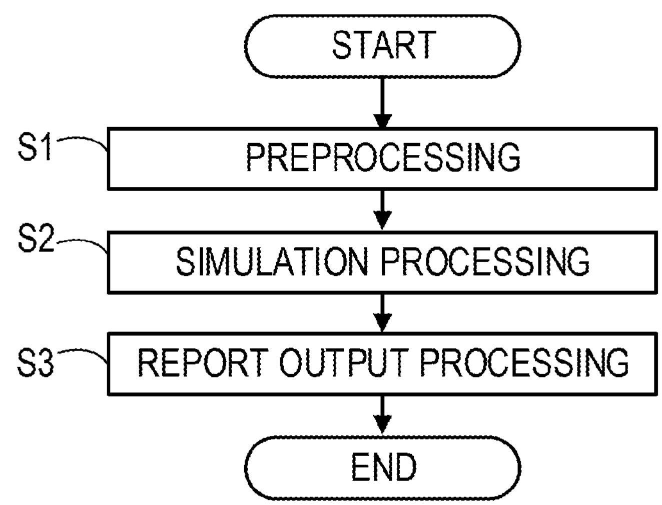
FIG. 4 is a flow chart illustrating an example of a design verification support processing procedure when a connection test of a scan chain is performed.

FIG. 4 is a flow chart illustrating an example of a design verification support processing procedure when a connection test of a scan chain is performed.

The design verification support process is performed in the order of a preprocessing S1, a simulation processing S2, and a report output processing S3. Hereinafter, an example of each processing will be described.

FIG. 5 is a flow chart illustrating an example of a preprocessing procedure.

(S10) The preprocessor 45 reads circuit information and test pattern information stored in the circuit information memory 40.

Figure 6:
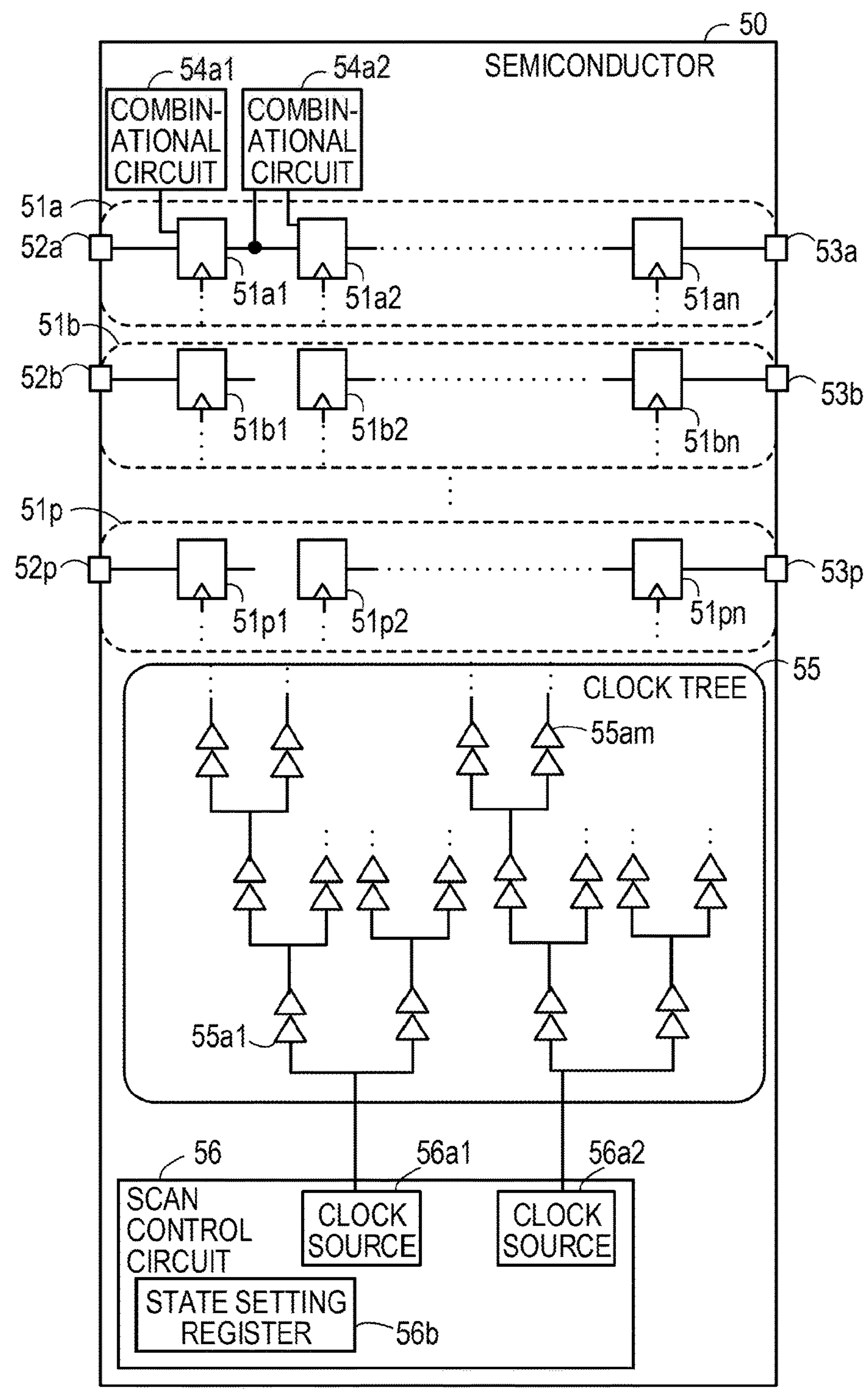
FIG. 6 is a view illustrating an example of a semiconductor as a design target represented by circuit information.

FIG. 6 is a view illustrating an example of a semiconductor as a design target represented by circuit information.

The semiconductor 50 includes a plurality of lines of scan chains 51*a*, 51*b*, . . . , and 51*p*.

Each of the scan chains 51*a* to 51*p* includes a plurality of memory circuits (scan flip-flops or latch circuits) coupled in series between a scan-in terminal and a scan-out terminal.

For example, the scan chain 51*a* includes memory circuits 51*a*1, 51*a*2, . . . , and 51*an* coupled in series between a scan-in terminal 52*a* and a scan-out terminal 53*a*. The scan chain 51*b* includes memory circuits 51*b*1, 51*b*2, . . . , and 51*bn* coupled in series between a scan-in terminal 52*b* and a scan-out terminal 53*b*. The scan chain 51*p* includes memory circuits 51*p*1, 51*p*2, . . . , and 51*pn* coupled in series between a scan-in terminal 52*p* and a scan-out terminal 53*p*.

The semiconductor 50 includes combinational circuits 54*a*1 and 54*a*2. In FIG. 6, two combinational circuits 54*a*1 and 54*a*2 are illustrated so as to simplify the illustration. However, for example, a combinational circuit is coupled to each of memory circuits of the scan chains 51*a* to 51*p*.

The semiconductor 50 includes a clock tree 55 and a scan control circuit 56.

The clock tree 55 includes clock buffers 55*a*1 to 55*am* coupled in a tree shape, and distributes a clock signal to each of the memory circuits of the scan chains 51*a* to 51*p*. The clock tree 55 may include a component circuit (see e.g., FIGS. 8 and 9) other than the clock buffers 55*a*1 to 55*am*.

The scan control circuit 56 includes clock sources 56*a*1 and 56*a*2, and a state setting register 56*b*.

The clock sources 56*a*1 and 56*a*2 output clock signals for shifting each of the memory circuits of the scan chains 51*a* to 51*p*. For example, when the clock source 56*a*1 outputs a clock signal for shifting each of memory circuits included in one scan chain, the clock source 56*a*2 outputs a clock signal for shifting each of memory circuits included in another scan chain.

When each memory circuit is a memory circuit corresponding to a level sensitive scan design (LSSD) method as one of scanning methods to be described below, two different clock signals are used to shift the memory circuit. The clock sources 56*a*1 and 56*a*2 may be clock sources that output the two different clock signals.

When a clock signal is supplied from the outside of the semiconductor 50, the clock sources 56*a*1 and 56*a*2 correspond to one of external input terminals of the semiconductor 50. One clock source or three or more clock sources may be employed.

The state setting register 56*b* is set with a state value indicating whether a mode is a mode for performing a scan test, or a state value indicating whether a scan chain for which a scan test is to be performed has been selected. According to the state value, for example, the memory circuit 51*a*1 determines whether to acquire a scan-in value supplied from the scan-in terminal 52*a* or a value output by the combinational circuit 54*a*1. The state setting register 56*b* may be set with the number of times of shifting of each memory circuit of the scan chains 51*a* to 51*p* at present (the number of times of scan shifts), or the total number of times of scan shifts in a scan test.

The circuit information read through the processing in step S10 includes information on a connection destination of each component circuit included in the above described semiconductor 50, a propagation delay occurring by each component circuit, and the type of each component circuit (a cell type). The circuit information includes identification information of a component circuit (hereinafter, referred to as an element ID), identification information of a terminal coupled to a clock terminal or a clock tree (hereinafter, referred to as a clock terminal ID or a clock tree terminal ID) or the like.

Meanwhile, the test pattern information read through the processing in step S10 is, for example, the information to be described below.

FIG. 7 is a view illustrating an example of the test pattern information.

Test pattern information 41*a* includes a scan-in value and an expected value of a scan-out value (an expected scan-out value) at each cycle of a clock signal output by a clock source (for example, the clock sources 56*a*1 and 56*a*2 in FIG. 6). The pulse type of the clock signal output by each clock source is written as "P." "1" or "0" preceded by "P" indicates a pattern (a value of 1 or 0) to be input to other LSI external terminals (diagnostic terminals). When two clock sources are present, pulse types of clock signals output by the two clock sources, respectively, and patterns for other LSI external terminals are combined and expressed as "PP01" or "PP11." The description order of terminals is determined in advance for each LSI, by which it is possible to determine what character number corresponds to a pattern of which terminal. Furthermore, "P" may indicate a positive pulse, and instead of "P," "N" indicating a negative pulse may be set.

As the scan-in values, in the example of FIG. 7, 00 . . . 0 and 11 . . . 1 are repeatedly input to the scan-in terminals 52*a* to 52*p* of FIG. 6 for predetermined cycles, and thereafter, 00 . . . 0 are input.

The expected scan-out values are set to "XX . . . X" before an $M+1^{th}$ cycle in which scan-in values of an $N+0^{th}$ cycle are output from the scan-out terminals 53*a* to 53*p* by a shift operation of each memory circuit of the scan chains 51*a* to 51*p*. "X" indicates that there is no expected value. At the M+1$^{th}$ and subsequent cycles, the same values as scan-in values at the first and subsequent cycles are set to expected scan-out values. In FIG. 7, "0" is indicated as "L" of a logical level, and "1" is indicated as "H" of a logical level.

(S11) After reading the circuit information and the test pattern information, the preprocessor 45 extracts scan control circuit information from the circuit information. The preprocessor 45 acquires, for example, a state value set to the state setting register 56*b* as illustrated in FIG. 6, as the scan control circuit information, and stores the state value in the preprocessing result memory 42.

(S12) Thereafter, the preprocessor 45 extracts scan chain information from the circuit information. The preprocessor 45 acquires information on a correspondence relationship between each of the scan chains 51*a* to 51*p* and the external terminal, a connection order of memory circuits, and a cell type from the circuit information, according to, for example, a scanning method of the scan chains 51*a* to 51*p*, and stores the information in the preprocessing result memory 42.

As the scanning method, a MUltipleXed Data (MUXD) method, or an LSSD may be employed. The MUXD method is a method in which the above described scan flip-flop having a multiplexer and a flip-flop is used as a memory circuit.

Meanwhile, the LSSD method is a method in which a memory circuit having a master latch and a slave latch is used, and different clock signals dedicated to a scan test are supplied to the master latch and the slave latch, respectively apart from a clock signal used for a normal operation of a semiconductor.

(S13) The preprocessor 45 extracts all clock sources of clock signals used for the scan test from the circuit information. Whether the clock source is an external terminal or an internal element of a semiconductor varies according to the type of the semiconductor, a scanning method or the like. When there are a plurality of clock sources as internal elements, the preprocessor 45 may accept an input by, for example, a user, and properly select a clock source of a clock signal to be used for the scan test.

(S14) The preprocessor 45 selects one clock source among all extracted clock sources. For example, the semiconductor 50 illustrated in FIG. 6 includes the two clock sources 56*a*1 and 56*a*2, and thus one of the two is selected.

(S15) Thereafter, the preprocessor 45 calculates a delay time and a signal polarity of a clock signal reaching each memory circuit included in a scan chain, based on the circuit information, and stores the delay time and the signal polarity in the preprocessing result memory 42.

For example, when selecting the clock source 56*a*1 in FIG. 6 through the processing in step S14, the preprocessor 45 integrates delay times occurring in respective component circuits (wiring or clock buffers) included in a path on the clock tree 55, from the clock source 56*a*1 to each memory circuit. These delay times are values fixed with respect to a propagation direction of a clock signal. Accordingly, a delay time of the clock signal reaching each memory circuit included in the scan chain is calculated. Further, by considering the case where an inverter circuit is used as the clock buffer, the preprocessor 45 calculates the signal polarity (H level or L level of) of the clock signal reaching each memory circuit.

(S16) Thereafter, the preprocessor 45 detects a clock control circuit within a clock tree based on the circuit information, and stores the clock control circuit in the preprocessing result memory 42. Within the clock tree, besides clock buffers, the clock control circuit that controls propagation of a clock signal may be included.

Figure 8:
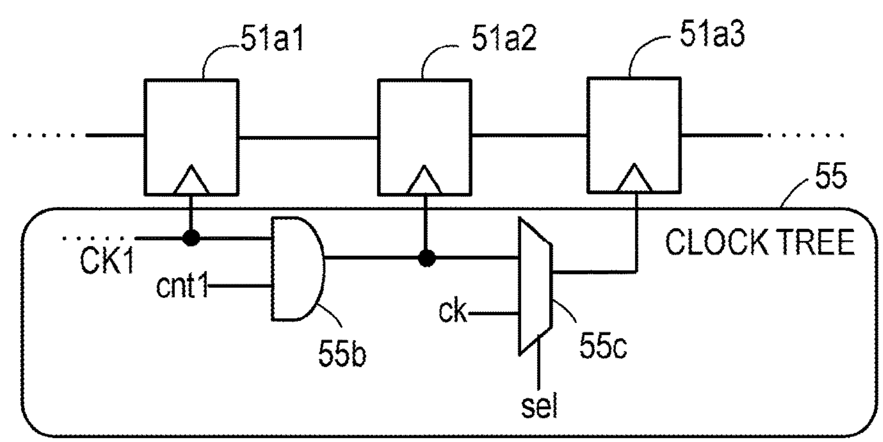
FIG. 8 is a view illustrating an example of a clock control circuit.

FIG. 8 is a view illustrating an example of a clock control circuit.

The clock tree 55 includes, as the clock control circuit, an AND circuit 55*b* or a selector 55*c*.

A clock signal CK1, which is also supplied to the memory circuit 51*a*1, is supplied to one side input terminal of the AND circuit 55*b*, and a control value cnt1 is supplied to the other side input terminal of the AND circuit 55*b*. An output terminal of the AND circuit 55*b* is coupled to a clock terminal of the memory circuit 51*a*2 and a first input terminal of the selector 55*c*. A clock signal CK different from the clock signal CK1 is supplied to a second input terminal of the selector 55*c*, and a selection signal sel is supplied to a third input terminal (a selection terminal) of the selector 55*c*. An output terminal of the selector 55*c* is coupled to a clock terminal of the memory circuit 51*a*3.

The control value cnt1, the clock signal CK, or the selection signal sel are supplied from, for example, the scan control circuit 56 illustrated in FIG. 6. The clock signal CK may be supplied from an external terminal.

When the control value cnt1 of the AND circuit 55*b* is 0, the output value of the AND circuit 55*b* always becomes 0. Thus, the clock signal CK1 is not propagated to the memory circuits 51*a*2 and 51*a*3. When the control value cnt1 is 1, in the case where the selection signal sel is a signal for selection of the clock signal CK, the clock signal CK1 is not propagated to the memory circuit 51*a*3. In this manner, the AND circuit 55*b* or the selector 55*c* functions as a clock control circuit that controls propagation of the clock signal CK1, or switches a clock signal to be used.

Such a clock control circuit may be detected and stored, and a signal change (a change of a control value or the like) of the clock control circuit at the time of a high-speed simulation to be described below may also be detected, so as to detect an error in which a clock signal is not propagated to a memory circuit.

(S17) The preprocessor 45 detects a component circuit within the clock tree which is not directly related to a shift operation of a memory circuit, based on the circuit information. Within the clock tree, besides a clock buffer or a clock control circuit, a circuit which is not directly related to a shift operation (which does not affect a shift operation) may be included.

Figure 9:
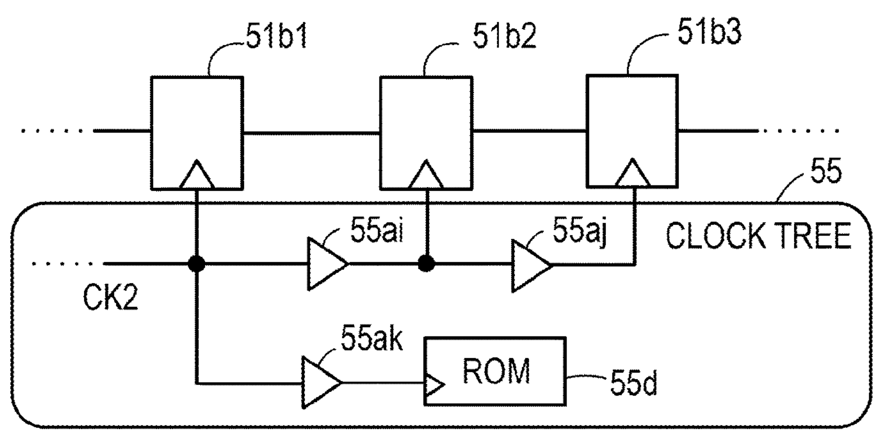
FIG. 9 is a view illustrating an example of a component circuit not directly related to a shift operation.

FIG. 9 is a view illustrating an example of a component circuit not directly related to a shift operation.

The clock tree 55 includes, besides clock buffers 55*ai*, 55*aj*, and 55*ak*, a read only memory (ROM) 55*d* as a component circuit which is not directly related to a shift operation.

A clock signal CK2 to be used for a scan test is supplied to a clock terminal of the memory circuit 51*b*1. The clock signal CK2 is supplied to a clock terminal of the memory circuit 51*b*2 via the clock buffer 55*ai*, and is supplied to a clock terminal of the memory circuit 51*b*3 via the clock buffers 55*ai* and 55*aj*. Further, the clock signal CK2 is supplied to a clock terminal of the ROM 55*d* via the clock buffer 55*ak*.

As a component circuit which is not directly related to a shift operation, besides the ROM 55*d*, a RAM or the like may be employed.

(S18) Thereafter, the preprocessor 45 calculates a delay time and a signal polarity of a clock signal reaching the detected component circuit not directly related to a shift operation, in the same manner as in the processing in step S15, and stores the delay time and the signal polarity in the preprocessing result memory 42.

By storing such information, at the time of a high-speed simulation, it is possible to provide a clock signal in consideration of a delay time or a signal polarity to the component circuit as well, and to calculate a signal change or the like for the component circuit.

(S19) The preprocessor 45 determines whether there is an unselected clock source, and repeats processings from step S14 when the unselected clock source is present. When there is no unselected clock source, the preprocessing ends.

An example of delay calculation result information stored in the preprocessing result memory 42 through the above described preprocessing will be described below.

FIG. 10 is a view illustrating an example of the delay calculation result information.

Delay calculation result information 42*a* includes each information piece detected or calculated through the above described preprocessing. For example, the delay calculation result information 42*a* includes respective element IDs ffa1 to fan of the memory circuits 51*a*1 to 51*an* which shift by a clock signal output by the clock source 56*a*1 (element ID: source1) as illustrated in FIG. 6. The delay calculation result information 42*a* includes respective clock terminal IDs cka1 to ckan of the memory circuits 51*a*1 to 51*an*. The delay calculation result information 42*a* includes rising delays tdra1 to tdran and falling delays tdfa1 to tdfan of a clock signal reaching each of the memory circuits 51*a*1 to 51*an*, and a signal polarity of the clock signal ("H" in the example of FIG. 10).

The delay calculation result information 42*a* includes, as information of a clock control circuit, for example, element IDs cntr1 and cntr2, and clock tree terminal IDs ckt1 and ckt2 corresponding to the AND circuit 55*b* and the selector 55*c*, respectively, illustrated in FIG. 8. The delay calculation result information 42*a*, as information of a component circuit not directly related to a shift operation, further includes, for example, an element ID ig1, and a clock terminal ID ckb1 of the ROM 55*d* illustrated in FIG. 9. The delay calculation result information 42*a* further includes, as information of a component circuit not directly related to a shift operation, a rising delay tdrb1, a falling delay tdfb1, and a signal polarity ("H" in the example of FIG. 10) of a clock signal reaching a clock terminal of the ROM 55*d*.

For the clock source 56*a*2 (element ID: source2) illustrated in FIG. 6 as well, the same information is included in the delay calculation result information 42*a*.

The preprocessing procedure illustrated in FIG. 5 is exemplary, and the sequence of respective processings may be properly changed. For example, the sequence of processings or the like in steps S11 and S12 may be changed.

Figure 11:
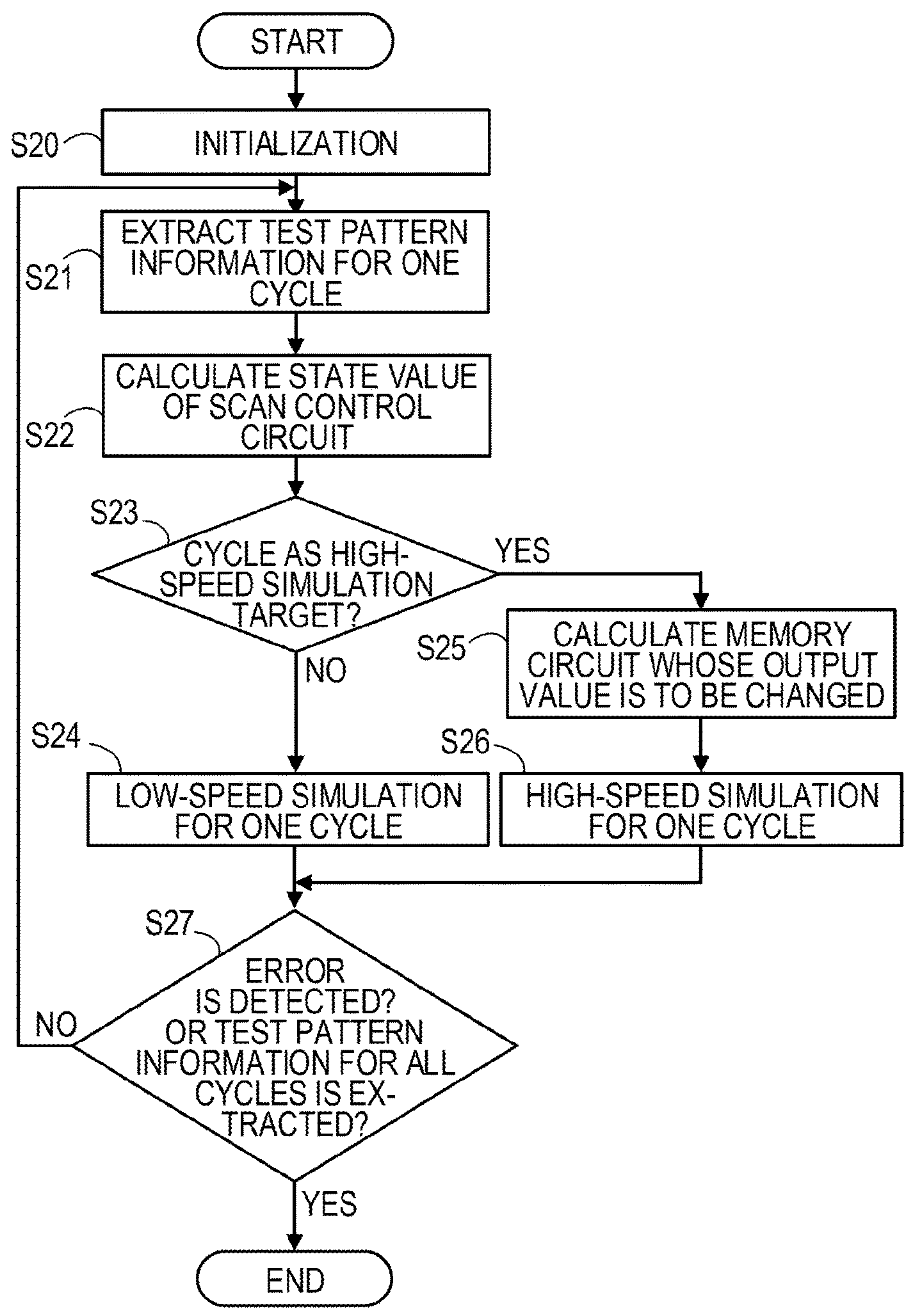
FIG. 11 is a flow chart illustrating an example of a simulation processing procedure.

FIG. 11 is a flow chart illustrating an example of a simulation processing procedure.

(S20) The simulator 46 performs initialization by setting, for example, an initial value to an I/O signal of each component circuit included in a semiconductor as a design target, a state value of a scan control circuit or the like.

(S21) The simulator 46 extracts test pattern information for one cycle.

(S22) The simulator 46 calculates the state value of the scan control circuit. The test pattern information includes information (for example, the above described pattern of 0 or 1) by which the scan control circuit 56 operates. The simulator 46 calculates the state value based on the information, and stores the state value in the under-calculation data memory 43.

(S23) The simulator 46 acquires the state value stored in the under-calculation data memory 43, and determines whether a present cycle is a cycle as a target for a high-speed simulation when the state value indicates a mode for performing a scan test. The simulator 46 determines whether the present cycle is a cycle as a target for a high-speed simulation based on the number of times of scan shifts at present (the number of times of shifting). The simulator 46 counts the number of times of operation of a clock signal obtained based on the test pattern information, and stores the number of times in the under-calculation data memory 43. Then, the simulator 46 may read the number of times of operation and use the number of times as the number of times of scan shifts.

The high-speed simulation is a simulation in which a memory circuit whose output value is to be changed is selected, and is given a clock signal, and an operation of the memory circuit is calculated. Hereinafter, a simulation, in which a processing of sequentially propagating a signal change of a clock source to each clock buffer in consideration of a delay in each clock buffer is performed, and an operation of each memory circuit whose clock terminal is reached by the signal change is calculated, is referred to as a low-speed simulation.

In the connection test of the scan chain according to the second embodiment, the simulator 46 performs a low-speed simulation for the first two cycles and the last one cycle.

Figure 12:
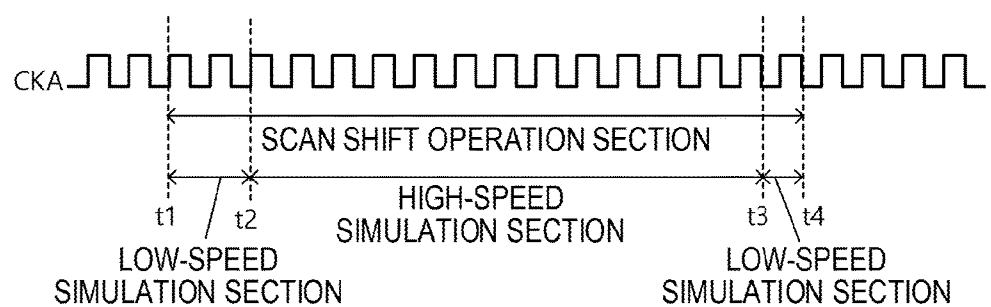
FIG. 12 is a view illustrating an example of cycles at which a high-speed simulation and a low-speed simulation are performed.

FIG. 12 is a view illustrating an example of cycles at which the high-speed simulation and the low-speed simulation are performed.

FIG. 12 illustrates an example of a clock signal CKA output by a certain clock source in order to shift each memory circuit included a certain scan chain. Timing t1 to t4 correspond to scan shift operation section, and correspond to a period obtained by multiplying the number of all scan shift cycles of test pattern information 41*a* as illustrated in FIG. 7, by cycles of the clock signal CKA.

Two cycles of the clock signal CKA, from timing t1 to timing t2, and the last one cycle at which the scan shift operation section ends, from timing t3 to timing t4, correspond to a section where a low-speed simulation is performed. The other section corresponds to a section where a high-speed simulation is performed.

For the first two cycles, the low-speed simulation is performed, and a timing verification or a racing verification is performed for all memory circuits included in the scan chain.

Figure 13:
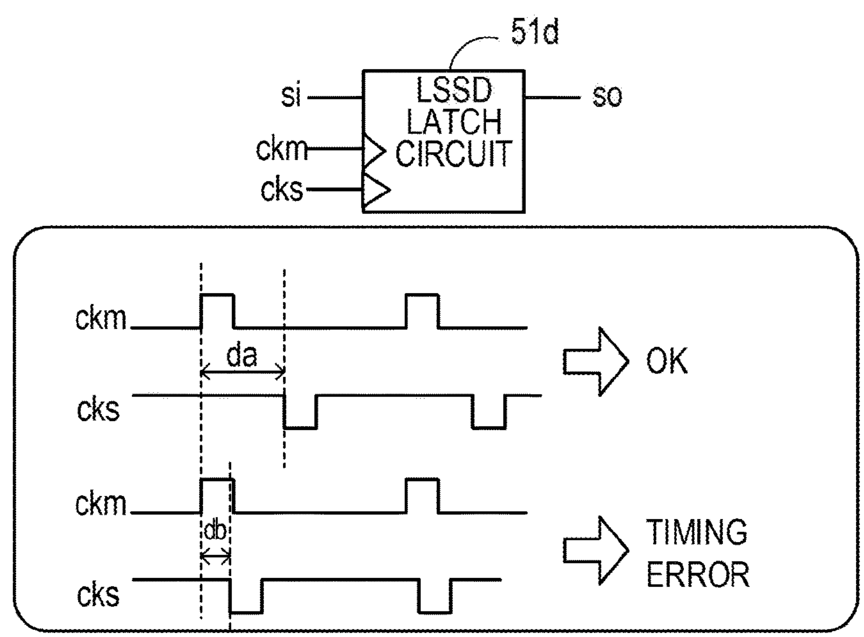
FIG. 13 is a view illustrating an example of a timing error in the case where an LSSD latch circuit is used.

FIG. 13 is a view illustrating an example of a timing error in the case where an LSSD latch circuit is used.

An LSSD latch circuit 51*d* includes a master latch and a slave latch (although not illustrated), and different clock signals ckm and cks dedicated to a scan test are supplied to the master latch and the slave latch, respectively. A scan-in value si is supplied to the LSSD latch circuit 51*d*. A clock signal used for a normal operation of a semiconductor or an output value of a combinational circuit is supplied to the LSSD latch circuit 51*d*, which is omitted in the illustration. The LSSD latch circuit 51*d* outputs a scan-out value so.

In the LSSD latch circuit 51*d*, when a time between a rising timing of the clock signal ckm and a falling timing of the clock signal cks is shorter than a predetermined threshold value, a timing error occurs. For example, a time between a rising timing of the clock signal ckm and a falling timing of the clock signal cks is a time da longer than a predetermined threshold value, a timing error does not occur. A time between a rising timing of the clock signal ckm and a falling timing of the clock signal cks is a time db shorter than a predetermined threshold value, a timing error occurs.

The reason the test pattern information for two cycles is used is to enable racing verification. Meanwhile, the reason the low-speed simulation is performed for the last one cycle is to make the state or the like of all memory circuits equivalent to the case where the low-speed simulation is performed for the whole of the scan shift operation section. This guarantees a simulation quality equivalent to the case where the low-speed simulation is performed for the whole of the scan shift operation section.

In the case where a large scale circuit, the section where the high-speed simulation is performed, from timing t2 to timing t3 in FIG. 12, corresponds to, for example, hundreds of thousands of cycles to millions of cycles. Thus, most of the scan shift operation section corresponds to a section where the high-speed simulation is performed.

When it is determined that the present cycle is not a cycle as a target for a high-speed simulation through the processing in step S23, the processing in step S24 is performed, and when it is determined that the present cycle is a cycle as a target for a high-speed simulation, the processing in step S25 is performed.

(S24) The simulator 46 performs a low-speed simulation for one cycle, and then, performs the processing in step S27.

(S25) The simulator 46 calculates a memory circuit whose output value is to be changed at the corresponding cycle, among a plurality of memory circuits included in the scan chain, based on the test pattern information.

(S26) Then, the simulator 46 performs a high-speed simulation for one cycle. Then, the simulator 46 performs the processing in step S27.

(S27) The simulator 46 determines whether an error has been detected through the processings in steps S24 to S26 or whether test pattern information has been extracted for all cycles. Then, when an error has been detected, or test pattern information has been extracted for all cycles, the simulation processing ends. When an error has not been detected, and test pattern information has not been extracted for all cycles, the simulator 46 repeats processings from step S21.

Even when an error has been detected, the processings from step S21 may be repeated until extraction of test pattern information for all cycles is completed.

Next, an example of a low-speed simulation sequence for one cycle will be described.

FIG. 14 is a flow chart illustrating an example of a low-speed simulation sequence for one cycle.

(S30) The simulator 46 selects one signal change event occurring at the present cycle. The signal change event includes the above described change or the like in a control value of a clock control circuit, or an input/output value of a combinational circuit, as well as a change of a scan-in value, or a change of a logical level of a clock signal which may be calculated based on delay calculation result information.

(S31) Then, the simulator 46 determines whether the number of times of scan shifts corresponds to first or second scan shift based on a state value indicating the present number of times of scan shifts. When determining that the number of times of scan shifts corresponds to first or second scan shift, the simulator 46 performs the processing in step S32. When determining that the number of times of scan shifts does not correspond to first nor second scan shift (when the number of times of scan shifts corresponds to the last scan shift because the low-speed simulation is performed for the first two cycles and the last one cycle), the simulator 46 performs the processing in step S36.

(S32) The simulator 46 determines whether the selected signal change event is a signal change of a clock terminal of a certain memory circuit included in the scan chain. When determining that the selected signal change event is a signal change of a clock terminal of a certain memory circuit included in the scan chain, the simulator 46 performs the processing in step S33. When determining that the selected signal change event is not a signal change of a clock terminal of a memory circuit included in the scan chain, the simulator 46 performs the processing in step S34.

(S33) The simulator 46 stores clock signal propagation information indicating that the signal change has occurred in the clock terminal of the memory circuit, in the under-calculation data memory 43. Thereafter, the simulator 46 performs the processing in step S36.

(S34) The simulator 46 determines whether the selected signal change event is a signal change of a clock terminal of a component circuit within a clock tree which is not directly related to a shift operation. When determining that the selected signal change event is a signal change of a clock terminal of such a component circuit, the simulator 46 performs the processing in step S35. When determining that the selected signal change event is not a signal change of a clock terminal of such a component circuit, the simulator 46 performs the processing in step S36.

As the component circuit within the clock tree not directly related to a shift operation, a ROM, a RAM or the like included in the clock tree may be employed as described above.

(S35) The simulator 46 stores the clock signal propagation information indicating that the signal change has occurred in the clock terminal of the component circuit within the clock tree which is not directly related to a shift operation, in the under-calculation data memory 43. Then, the simulator 46 performs the processing in step S36.

(S36) The simulator 46 performs a signal change simulation. The signal change simulation is a processing in which, for example, for a memory circuit, a change of a scan-out value according to a change of a scan-in value and a clock signal, a change of an output value according to a change of an input value of a combinational circuit or the like is calculated. For the memory circuit, a timing verification is performed on a set-up time or a holding time. For example, in the case where the above described LSSD latch circuit is used, detection of a timing error is performed as a signal change simulation at the time of the second scan shift.

In the signal change simulation, a scan-out value output from a scan-out terminal (an external terminal) of the scan chain is compared to an expected value of the scan-out value so as to detect whether an expected value error is occurring.

A signal change simulation result is stored in the under-calculation data memory 43. Then, the simulator 46 performs the processing in step S37.

(S37) the simulator 46 determines whether a cycle has ended (a time for one cycle has elapsed). When determining that the cycle has ended, the simulator 46 ends a low-speed simulation for one cycle, and when determining that the cycle has not ended, the simulator 46 repeats the processings from step S30.

Next, an example of a sequence of a processing of calculating memory circuits whose output values are to be changed will be described.

FIG. 15 is a flow chart illustrating an example of a sequence of a processing of calculating memory circuits whose output values are to be changed.

(S40) The simulator 46 specifies the head of a group of memory circuits whose output values are to be changed, among all memory circuits within a scan chain, based on test pattern information at the present cycle.

For example, among the scan chains 51*a* to 51*p* of the semiconductor 50 illustrated in FIG. 6, a scan chain in which scan-in values are input to the scan-in terminals 52*a* to 52*p* as external terminals, and values thereof are detected from test pattern information. The output value of the memory circuit at the head of the scan chain in which there is a change in the scan-in value may change at the present cycle, and thus the memory circuit is specified.

(S41) Thereafter, the simulator 46 determines whether the number of times of scan shifts corresponds to a third scan shift based on a state value indicating the present number of times of scan shifts. When determining that the number of times of scan shifts corresponds to a third scan shift, the simulator 46 performs the processing in step S42, and when determining that the number of times of scan shifts does not correspond to a third scan shift, the simulator 46 performs the processing in step S46.

(S42) The simulator 46 specifies the group of memory circuits whose output values are to be changed.

For example, it is assumed that the memory circuits 51*a*1 to 51*p*1 at the head of the scan chains 51*a* to 51*p* in FIG. 6 are specified through the processing in step S40. Here, among the memory circuits 51*a*2 to 51*an*, 51*b*2 to 51*bn*, . . . , 51*p*2 to 51*pn* at the following stages, a group of memory circuits whose current output values (held values) are different from input values is specified as the group of memory circuits whose output values are to be changed at the present cycle.

(S43) Thereafter, based on clock signal propagation information stored in the processing in step S33 in FIG. 14, the simulator 46 determines whether a clock signal is propagated to all memory circuits of all scan chains including memory circuits to be shifted. When determining that a clock signal is propagated to all memory circuits of all scan chains including memory circuits to be shifted, the simulator 46 performs the processing in step S44. When determining that a clock signal is not propagated to all memory circuits of all scan chains including memory circuits to be shifted, the simulator 46 performs the processing in step S45.

(S44) Based on clock signal propagation information stored in the processing stored in step S35 in FIG. 14, the simulator 46 determines whether a clock signal is propagated to a component circuit within a clock tree which is not directly related to a scan shift. When determining that a clock signal is propagated to a component circuit within a clock tree which is not directly related to a scan shift, the simulator 46 ends the processing of calculating memory circuits whose output values are to be changed. When determining that a clock signal is not propagated to a component circuit within a clock tree which is not directly related to a scan shift, the simulator 46 performs the processing in step S45.

(S45) The simulator 46 determines that an error has occurred, stores error information indicating contents of the error in the under-calculation data memory 43, and ends the processing of calculating memory circuits whose output values are to be changed.

(S46) The simulator 46 shifts a group of memory circuits whose output values are to be changed at a previous cycle, by one bit to specify a group of memory circuits whose output values are to be changed at the present cycle. Thereafter, the simulator 46 ends the processing of calculating memory circuits whose output values are to be changed.

Figure 16:
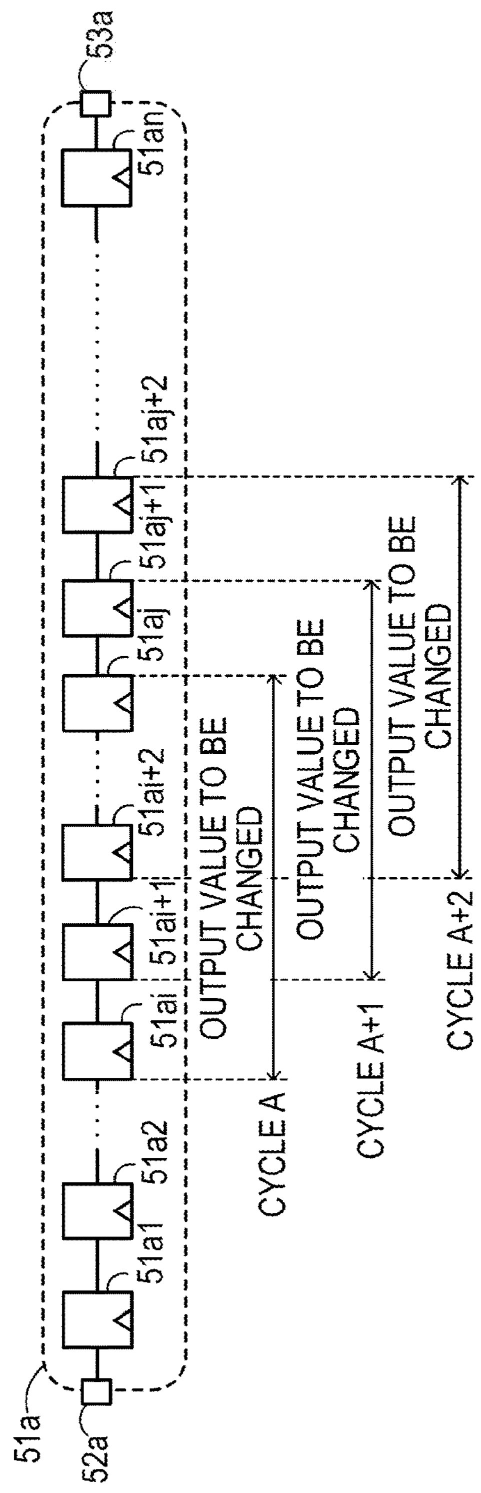
FIG. 16 is a view illustrating an example of a group of memory circuits whose output values are to be changed.

FIG. 16 is a view illustrating an example of a group of memory circuits whose output values are to be changed.

For example, at a certain cycle A, it is assumed that memory circuits 51*ai* to 51*aj* within the scan chain 51*a* belong to a group of memory circuits whose output values are to be changed. At a following cycle A+1, a group of memory circuits 51*ai*+1 to 51*aj*+1, which is obtained by shifting the memory circuits 51*ai* to 51*aj* by one bit (one memory circuit), in the direction of the scan-out terminal 53*a*, is specified as a group of memory circuits whose output values are to be changed.

At a following cycle A+2, likewise, a group of memory circuits 51*ai*+2 to 51*aj*+2, which is obtained by shifting the memory circuits 51*ai*+1 to 51*aj*+1 by one bit in the direction of the scan-out terminal 53*a*, is specified as a group of memory circuits whose output values are to be changed.

The processing procedure illustrated in FIG. 15 is exemplary, and the sequence of respective processings may be properly changed. For example, the sequence of processings or the like in steps S43 and S44 may be changed.

Next, an example of high-speed simulation sequence for one cycle will be described.

Figure 17:
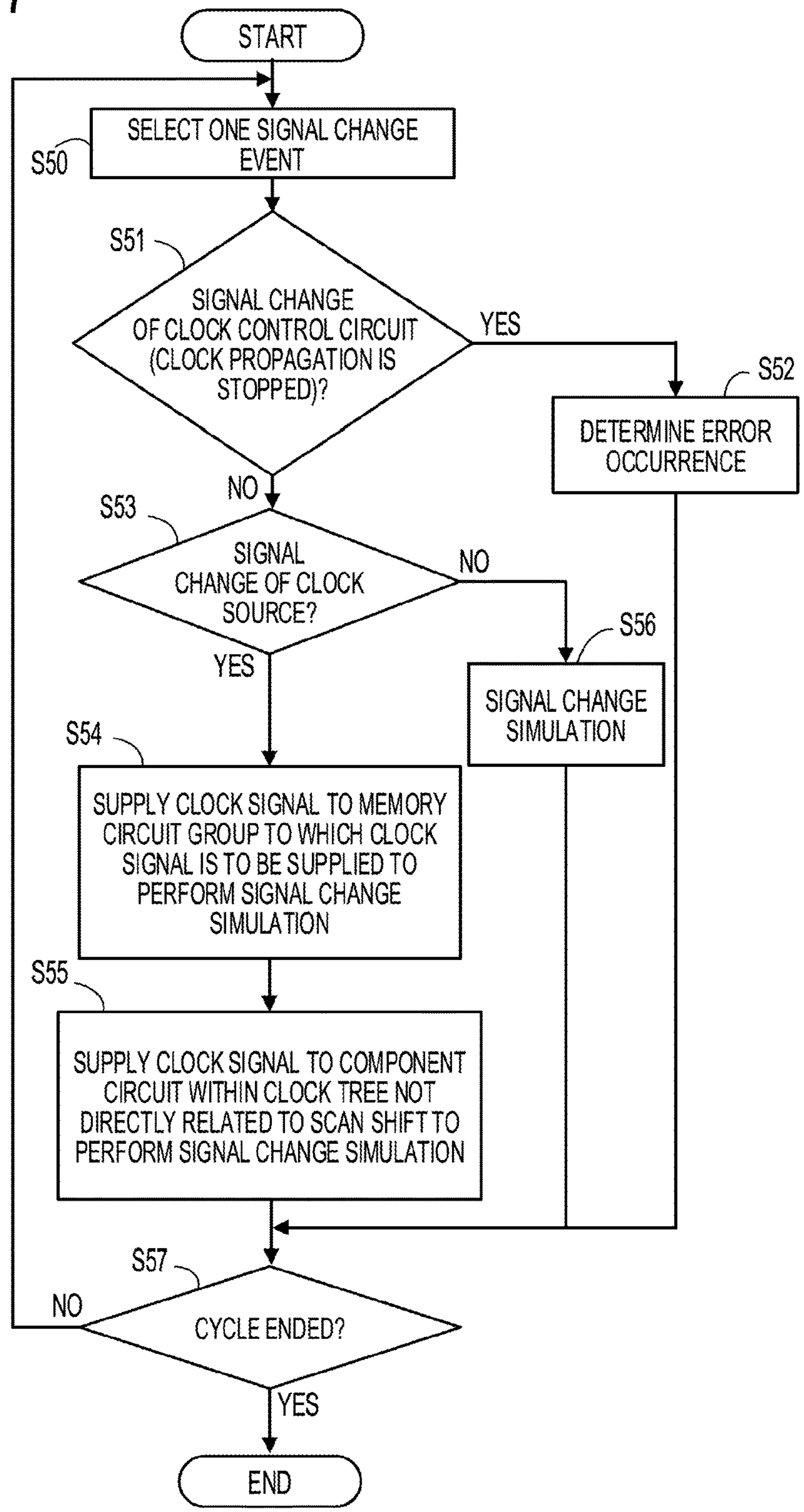
FIG. 17 is a flow chart illustrating an example of a high-speed simulation sequence for one cycle.

FIG. 17 is a flow chart illustrating an example of a high-speed simulation sequence for one cycle.

(S50) The simulator 46 selects one signal change event occurring at the present cycle.

(S51) The simulator 46 determines whether the selected signal change event is a signal change of a clock control circuit (whether propagation of a clock signal is stopped). When the selected signal change event is a signal change of a clock control circuit, the simulator 46 performs the processing in step S52, and when the selected signal change event is not a signal change of a clock control circuit, the simulator 46 performs the processing in step S53.

(S52) The simulator 46 determines that an error has occurred, stores error information indicating contents of the error in the under-calculation data memory 43, and then, performs the processing in step S57. For example, in the clock control circuit such as the AND circuit 55*b* or the selector 55*c* as illustrated in FIG. 8, in the case where the control value cnt1 changes from 1 to 0, or in the case where the selection signal sel changes to select a clock signal CK, a memory circuit appears to which the clock signal is not propagated. In such a case, it is determined that an error has occurred.

(S53) Next, the simulator 46 determines whether the selected signal change event is a signal change of a clock source. When the selected signal change event is a signal change of a clock source, the simulator 46 performs the processing in step S54, and when the selected signal change event is not a signal change of a clock source, the simulator 46 performs the processing in step S56.

(S54) The simulator 46 supplies a clock signal to a memory circuit group to which the clock signal is to be supplied, thereby performing a signal change simulation. The memory circuit group to which the clock signal is to be supplied is obtained by adding one memory circuit to a memory circuit group whose output values are to be changed, in the direction of a scan-out terminal. This is to make it possible to consider an influence of the above described racing phenomenon or the like.

Figure 18:
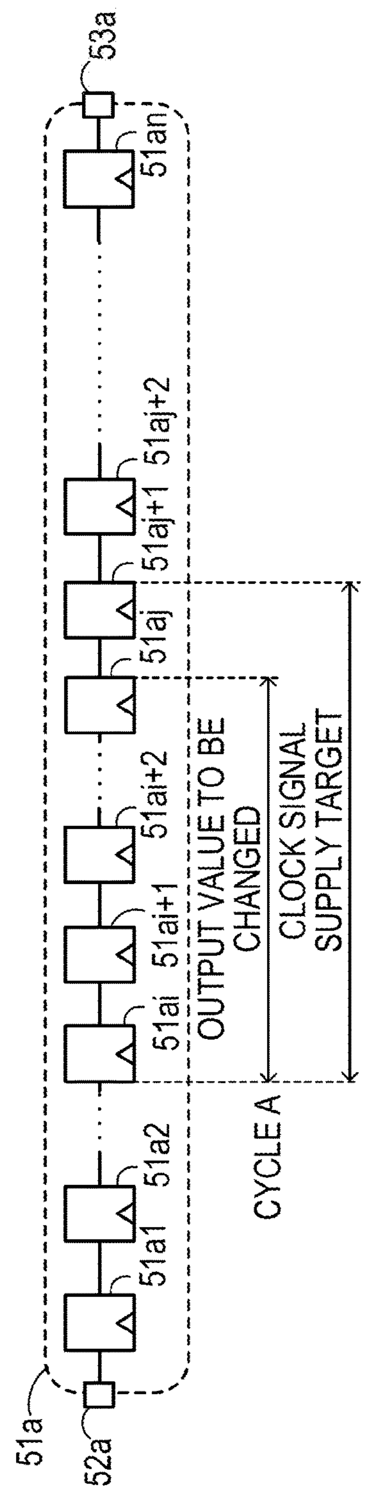
FIG. 18 is a view illustrating an example of a memory circuit group to which a clock signal is to be supplied.

FIG. 18 is a view illustrating an example of a memory circuit group to which a clock signal is to be supplied.

At a certain cycle A, when memory circuits 51*ai* to 51*aj* are specified as a memory circuit group whose output values are to be changed, the memory circuit group to which a clock signal is to be supplied includes memory circuits 51*ai* to 51*aj*+1.

The simulator 46 acquires, for example, a delay time (a rising delay and a falling delay) and a signal polarity that are calculated in advance for each of the memory circuits 51*ai* to 51*aj*+1, from delay calculation result information stored in the preprocessing result memory 42.

Then, the simulator 46 supplies (sets) a clock signal, which is obtained by delaying a clock signal output by a clock source by each delay time, and has the acquired signal polarity, to a clock terminal of each of the memory circuits 51*ai* to 51*aj*+1. Then, the simulator 46 calculates a change of a scan-out value according to a change of a scan-in value and a clock signal in each of the memory circuits to which the clock signal is supplied. For each of the memory circuits to which the clock signal is supplied, a timing verification for a set-up time or a holding time is performed.

In the signal change simulation, a scan-out value output from a scan-out terminal (an external terminal) of the scan chain is compared to an expected value of the scan-out value so as to detect whether an expected value error has occurred.

A signal change simulation result is stored in the under-calculation data memory 43.

(S55) The simulator 46 supplies a clock signal to a component circuit within a clock tree not directly related to a scan shift, thereby performing a signal change simulation. The simulator 46 acquires, for example, a delay time (a rising delay and a falling delay) and a signal polarity, which are calculated in advance for the component circuit within the clock tree, such as a ROM or a RAM, from delay calculation result information stored in the preprocessing result memory 42. Then, the simulator 46 supplies (sets) a clock signal, which is obtained by delaying a clock signal output by a clock source by the delay time, and has the acquired signal polarity, to a clock terminal of the component circuit. Then, the simulator 46 calculates (simulates) a change of an output value according to a change of an input value and a clock signal, in the component circuit to which the clock signal is supplied. The simulation result is stored in the under-calculation data memory 43.

(S56) The simulator 46 performs a signal change simulation. Here, the signal change simulation is a processing in which, for example, a change or the like of an output value according to a change of an input value of a combinational circuit, which is not related to a change of a clock signal output by a clock source, is calculated. The signal change simulation result is stored in the under-calculation data memory 43. Then, the processing in step S57 is performed.

(S57) The simulator 46 determines whether the cycle has ended (a time for one cycle has elapsed). When determining that the cycle has ended, the simulator 46 ends a high-speed simulation for one cycle, and when determining that the cycle has not ended, the simulator 46 repeats the processings from step S50.

The high-speed simulation processing procedure illustrated in FIG. 17 is exemplary, and the sequence of respective processings may be properly changed. For example, the sequence of processings or the like in steps S54 and S55 may be changed.

After the above described simulation processing, a report output processing is performed as illustrated in FIG. 4. The result output unit 47 outputs report information based on the simulation processing result in the simulator 46. For example, the result output unit 47 may store the report information in the calculation result memory 44, or display the report information on the display 34*a*.

FIG. 19 is a view illustrating a display example of report information.

For example, as the report information, besides a simulation start time, information on a timing error and an expected value error is displayed.

As the information of a timing error, information indicating a simulation time or cycle at which the timing error has occurred, and indicating whether the timing error is about a set-up time or a holding time is displayed. Further, an element ID of a component circuit for which a timing error has occurred is displayed as, for example, "gate(/EO/JBA9B/I025H)" or the like, and the type of a component circuit is displayed as, for example, "type(KOBSC)" or the like. Further, as information indicating terminals between which a timing error of a signal has occurred, for example, a timing error of a signal between a clock terminal and a scan-in terminal is displayed as "pin(CLK SI)" or the like.

As the information of an expected value error (denoted as a "strobe error"), information on a simulation time or cycle at which the expected value error has occurred is displayed. Further, information indicating a scan-out terminal in which the expected value error has occurred is displayed as, for example, "pin(CR74)" or the like. A scan-out value and an expected value obtained through a simulation is displayed as, for example, "status(sim: X pat: L)" or the like.

A circuit information name, a test pattern information name, a simulation unit time, a simulation execution time, the number of expected value errors, the number of timing errors or the like is displayed.

As described above, the design verification support apparatus 30 according to the second embodiment, which simulates a connection test of a scan chain through a design verification process, calculates in advance a delay time of a clock signal which occurs between a clock source and each memory circuit of the scan chain. Then, the design verification support apparatus 30 limits the number of memory circuits for which an operation (a change of an output value) is to be calculated when the clock signal is supplied, based on the number of memory circuits whose output values are to be changed by a test pattern. Thus, a calculation time may be shortened.

When an error is detected in the simulation the connection test of a scan chain, repetitive simulations may be performed for an error analysis. However, according to the above described method, the calculation time may be shortened, and thus a TAT for the error analysis may also be shortened. Accordingly, a period for a design verification process may be shortened, and thus, it is also expected to shorten the whole period of a manufacturing process of a semiconductor.

As described above, the above described processing contents are realized by executing a program in the design verification support apparatus 30.

The program may be recorded in a computer readable recording medium (e.g., the recording medium 36*a*). As for the recording medium, for example, a magnetic disk, an optical disk, a magneto-optical disk, a semiconductor memory or the like may be used. The magnetic disk includes an FD or a HDD. The optical disk includes a CD, a CD-recordable/rewritable (R/RW), a DVD or a DVD-R/RW. The program may be recorded in a portable-type recording medium so as to be distributed. In this case, the program may be copied from the portable-type recording medium to another recording medium (e.g., HDD 33) and executed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A design verification support apparatus comprising:

a memory configured to store circuit information including information on a connection destination of a component circuit included in a semiconductor having a scan chain, and a propagation delay occurring by the component circuit; and test pattern information indicating a test value to be input from a scan-in terminal of the scan chain at each cycle of a first clock signal output by a clock source; and a processor coupled to the memory, configured to perform a first processing of acquiring the circuit information and the test pattern information from the memory, calculating a delay time occurring until the first clock signal reaches each of a plurality of memory circuits coupled in series and included in the scan chain from the clock source, based on the circuit information, and selecting a first memory circuit whose first output value is to be changed by a shift operation among the plurality of memory circuits, based on the test pattern information at the cycle; and a second processing of calculating the first output value of the first memory circuit when a second clock signal is supplied to the first memory circuit, the second clock signal being obtained by delaying the first clock signal by a first delay time calculated for the first memory circuit among delay times calculated for the plurality of memory circuits, respectively.

2. The design verification support apparatus according to claim 1, comprising:

the processor configured to detect whether a first error occurs based on a comparison result obtained by comparing a scan-out value output from a scan-out terminal of the scan chain through the second processing with an expected value of the scan-out value.

3. The design verification support apparatus according to claim 1, comprising:

the processor configured to calculate a signal polarity of the first clock signal when the first clock signal reaches each of the plurality of memory circuits, and then calculate the first output value of the first memory circuit when the second clock signal having the signal polarity is supplied to the first memory circuit.

4. The design verification support apparatus according to claim 1, comprising:

the processor configured to detect, from the circuit information, a clock control circuit, which is included within a clock tree that propagates the first clock signal to a clock terminal of each of the plurality of memory circuits and controls propagation of the first clock signal to the clock terminal, and detect whether a second error occurs based on a determination result obtained by determining whether the clock control circuit has changed to a state in which propagation of the first clock signal to the clock terminal is stopped when the second processing is performed.

5. The design verification support apparatus according to claim 1, comprising: the processor configured to detect, from the circuit information, a first component circuit, which is included within a clock tree that propagates the first clock signal to a clock terminal of each of the plurality of memory circuits and does not affect the shift operation, calculate a second delay time occurring until the first clock signal reaches the first component circuit from the clock source, based on the circuit information, and calculate a change of a signal for the first component circuit when a third clock signal is supplied to the first component circuit when the second processing is performed, the third clock signal being obtained by delaying the first clock signal by the second delay time.

6. The design verification support apparatus according to claim 1, comprising: the processor configured to calculate respective output values of the plurality of memory circuits based on the second clock signal obtained by delaying the first clock signal by the delay time calculated for each of the plurality of memory circuits at other than the cycles at first two cycles and a last one cycle of the first clock signal in a scan shift operation section in which the shift operation is performed.

7. A design verification support method performed by a computer coupled to a memory that stores circuit information including information on a connection destination of a component circuit included in a semiconductor having a scan chain, and a propagation delay occurring by the component circuit; and test pattern information indicating a test value to be input from a scan-in terminal of the scan chain at each cycle of a first clock signal output by a clock source, the design verification support method comprising:

acquiring the circuit information and the test pattern information from the memory;

calculating a delay time occurring until the first clock signal reaches each of a plurality of memory circuits coupled in series and included in the scan chain from the clock source, based on the circuit information;

selecting a first memory circuit whose first output value is to be changed by a shift operation among the plurality of memory circuits, based on the test pattern information at the cycle; and calculating the first output value of the first memory circuit when a second clock signal is supplied to the first memory circuit, the second clock signal being obtained by delaying the first clock signal by a first delay time calculated for the first memory circuit among delay times calculated for the plurality of memory circuits, respectively.

8. A non-transitory computer-readable recording medium having stored therein a program for causing a computer to execute a process for design verification support, the computer coupled to a memory that stores circuit information including information on a connection destination of a component circuit included in a semiconductor having a scan chain, and a propagation delay occurring by the component circuit; and test pattern information indicating a test value to be input from a scan-in terminal of the scan chain at each cycle of a first clock signal output by a clock source, the process comprising:

acquiring the circuit information and the test pattern information from the memory;

calculating a delay time occurring until the first clock signal reaches each of a plurality of memory circuits coupled in series and included in the scan chain from the clock source, based on the circuit information;

selecting a first memory circuit whose first output value is to be changed by a shift operation among the plurality of memory circuits, based on the test pattern information at the cycle; and calculating the first output value of the first memory circuit when a second clock signal is supplied to the first memory circuit, the second clock signal being obtained by delaying the first clock signal by a first delay time calculated for the first memory circuit among delay times calculated for the plurality of memory circuits, respectively.

* * * * *